(12) United States Patent
Cao et al.

(10) Patent No.: US 8,988,398 B2
(45) Date of Patent: Mar. 24, 2015

(54) MULTI-TOUCH INPUT DEVICE WITH ORIENTATION SENSING

(75) Inventors: Xiang Cao, Beijing (CN); Minghui Sun, Kochi (JP); Shahram Izadi, Cambridge (GB); Hrvoje Benko, Seattle, WA (US); Kenneth P. Hinckley, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 821 days.

(21) Appl. No.: 13/026,058

(22) Filed: Feb. 11, 2011

(65) Prior Publication Data

US 2012/0206330 A1    Aug. 16, 2012

(51) Int. Cl.
| | |
|---|---|
| *G06F 3/033* | (2013.01) |
| *G09G 5/08* | (2006.01) |
| *G06F 3/045* | (2006.01) |
| *G06F 3/0346* | (2013.01) |
| *G06F 3/0354* | (2013.01) |
| *G06F 3/038* | (2013.01) |

(52) U.S. Cl.
CPC .......... *G06F 3/03545* (2013.01); *G06F 3/0346* (2013.01); *G06F 3/03547* (2013.01); *G06F 3/0383* (2013.01)
USPC ............................ 345/179; 345/158; 345/174

(58) Field of Classification Search
CPC ... G06F 3/03545; G06F 3/0317; G06F 3/041; G06F 3/03547; G06F 3/044; G06F 3/0488
USPC .................... 345/156–179; 178/19.01–19.05; 715/863
See application file for complete search history.

(56) References Cited

U.S. PATENT DOCUMENTS

| | | |
|---|---|---|
| 5,198,623 A | 3/1993 | Landmeier |
| 5,414,227 A | 5/1995 | Schubert et al. |
| 5,463,725 A | 10/1995 | Henckel et al. |
| 5,625,833 A | 4/1997 | Levine et al. |
| 5,867,163 A | 2/1999 | Kurtenbach |
| 5,914,701 A | 6/1999 | Gersheneld |
| 5,956,020 A | 9/1999 | D'Amico et al. |

(Continued)

FOREIGN PATENT DOCUMENTS

| | | |
|---|---|---|
| KR | 10-2012-0005417 | 1/2012 |
| WO | 2009084809 A1 | 7/2009 |

OTHER PUBLICATIONS

Bao, et al., "Effect of Tilt Angle of Tablet on Pen-based Input Operation Based on Fitts' Law", Proceedings of the 2010 IEEE International Conference on Information and Automation, Jun. 2010, pp. 99-104.

(Continued)

*Primary Examiner* — Hong Zhou
(74) *Attorney, Agent, or Firm* — Jeremy Snodgrass; Judy Yee; Micky Minhas

(57) ABSTRACT

A multi-touch orientation sensing input device may enhance task performance efficiency. The multi-touch orientation sensing input device may include a device body that is partially enclosed or completely enclosed by a multi-touch sensor. The multi-touch orientation sensing input device may further include an inertia measurement unit that is disposed on the device body, The inertia measurement unit may measures a tilt angle of the device body with respect to a horizontal surface, as well as a roll angle of the device body along a length-wise axis of the device body with respect to an initial point on the device body.

20 Claims, 15 Drawing Sheets

(56) References Cited

U.S. PATENT DOCUMENTS

| | | | |
|---|---|---|---|
| 6,307,548 B1 | 10/2001 | Flinchem et al. | |
| 6,788,292 B1 | 9/2004 | Nako et al. | |
| 6,906,703 B2 | 6/2005 | Vablais et al. | |
| 7,231,609 B2 | 6/2007 | Baudisch | |
| 7,289,102 B2 | 10/2007 | Hinckley et al. | |
| 7,362,221 B2 | 4/2008 | Katz | |
| 7,400,316 B2 | 7/2008 | Appleyard et al. | |
| 7,499,024 B2 | 3/2009 | Johnston, Jr. et al. | |
| 7,532,196 B2 | 5/2009 | Hinckley | |
| 7,567,242 B2 | 7/2009 | Perkins et al. | |
| 7,703,047 B2 | 4/2010 | Keely et al. | |
| 7,812,826 B2 | 10/2010 | Ording et al. | |
| 7,812,828 B2 | 10/2010 | Westerman et al. | |
| 7,847,789 B2 | 12/2010 | Kolmykov-Zotov et al. | |
| 7,956,847 B2 | 6/2011 | Christie | |
| 7,982,739 B2 | 7/2011 | Pasula | |
| 8,228,292 B1 | 7/2012 | Ruiz et al. | |
| 8,265,705 B2 | 9/2012 | Lee | |
| 8,413,077 B2 | 4/2013 | Yamamoto et al. | |
| 2003/0076310 A1* | 4/2003 | Kanzaki et al. | 345/179 |
| 2003/0164821 A1* | 9/2003 | Rezania | 345/179 |
| 2004/0012575 A1* | 1/2004 | Homer et al. | 345/179 |
| 2004/0047505 A1 | 3/2004 | Ghassabian | |
| 2004/0140962 A1* | 7/2004 | Wang et al. | 345/179 |
| 2004/0189594 A1 | 9/2004 | Sterling | |
| 2004/0203520 A1 | 10/2004 | Schirtzinger et al. | |
| 2005/0024346 A1 | 2/2005 | Dupraz et al. | |
| 2005/0079896 A1 | 4/2005 | Kokko et al. | |
| 2005/0179648 A1 | 8/2005 | Barabe et al. | |
| 2005/0216867 A1 | 9/2005 | Marvit et al. | |
| 2005/0253817 A1 | 11/2005 | Rytivaara et al. | |
| 2006/0012580 A1 | 1/2006 | Perski et al. | |
| 2006/0026535 A1 | 2/2006 | Hotelling et al. | |
| 2006/0109252 A1 | 5/2006 | Kolmykov-Zotov et al. | |
| 2006/0136840 A1 | 6/2006 | Keely et al. | |
| 2006/0146038 A1 | 7/2006 | Park et al. | |
| 2006/0177112 A1* | 8/2006 | Yang et al. | 382/120 |
| 2006/0197750 A1* | 9/2006 | Kerr et al. | 345/173 |
| 2006/0197753 A1 | 9/2006 | Hotelling | |
| 2006/0256008 A1 | 11/2006 | Rosenberg | |
| 2006/0267957 A1 | 11/2006 | Kolmykov-Zotov et al. | |
| 2006/0267958 A1 | 11/2006 | Kolmykov-Zotov et al. | |
| 2007/0002016 A1* | 1/2007 | Cho et al. | 345/157 |
| 2007/0070051 A1 | 3/2007 | Westerman et al. | |
| 2007/0075965 A1 | 4/2007 | Huppi et al. | |
| 2007/0113198 A1 | 5/2007 | Robertson et al. | |
| 2007/0126732 A1 | 6/2007 | Robertson et al. | |
| 2007/0152976 A1 | 7/2007 | Townsend et al. | |
| 2007/0247441 A1 | 10/2007 | Kim et al. | |
| 2007/0268274 A1 | 11/2007 | Westerman et al. | |
| 2008/0002888 A1 | 1/2008 | Yuan | |
| 2008/0012835 A1 | 1/2008 | Rimon et al. | |
| 2008/0040692 A1 | 2/2008 | Sunday et al. | |
| 2008/0106520 A1 | 5/2008 | Free et al. | |
| 2008/0158145 A1 | 7/2008 | Westerman | |
| 2008/0158168 A1 | 7/2008 | Westerman et al. | |
| 2008/0163130 A1 | 7/2008 | Westerman | |
| 2008/0191898 A1 | 8/2008 | Janik | |
| 2008/0259043 A1 | 10/2008 | Buil et al. | |
| 2008/0292195 A1 | 11/2008 | Vijayasenan et al. | |
| 2009/0066663 A1* | 3/2009 | Chang et al. | 345/173 |
| 2009/0073144 A1* | 3/2009 | Chen et al. | 345/179 |
| 2009/0083847 A1 | 3/2009 | Fadell et al. | |
| 2009/0109182 A1 | 4/2009 | Fyke et al. | |
| 2009/0153525 A1* | 6/2009 | Chang | 345/179 |
| 2009/0160816 A1 | 6/2009 | Westerman et al. | |
| 2009/0167702 A1 | 7/2009 | Nurmi | |
| 2009/0178007 A1 | 7/2009 | Matas et al. | |
| 2009/0209285 A1 | 8/2009 | Mcmahan | |
| 2009/0228842 A1 | 9/2009 | Westerman et al. | |
| 2009/0259969 A1 | 10/2009 | Pallakoff | |
| 2009/0260274 A1 | 10/2009 | Rogers | |
| 2009/0265671 A1 | 10/2009 | Sachs et al. | |
| 2009/0267896 A1* | 10/2009 | Hiramatsu | 345/157 |
| 2010/0007618 A1* | 1/2010 | Park et al. | 345/173 |
| 2010/0020025 A1 | 1/2010 | Lemort et al. | |
| 2010/0045705 A1 | 2/2010 | Vertegaal et al. | |
| 2010/0053095 A1 | 3/2010 | Wu et al. | |
| 2010/0053120 A1 | 3/2010 | Chang et al. | |
| 2010/0079493 A1 | 4/2010 | Tse et al. | |
| 2010/0083191 A1 | 4/2010 | Marshall | |
| 2010/0095234 A1 | 4/2010 | Lane et al. | |
| 2010/0103118 A1 | 4/2010 | Townsend et al. | |
| 2010/0123737 A1 | 5/2010 | Williamson et al. | |
| 2010/0127979 A1 | 5/2010 | Lee et al. | |
| 2010/0139990 A1 | 6/2010 | Westerman et al. | |
| 2010/0156941 A1 | 6/2010 | Seung | |
| 2010/0175018 A1 | 7/2010 | Petschnigg et al. | |
| 2010/0177121 A1 | 7/2010 | Homma et al. | |
| 2010/0188328 A1 | 7/2010 | Dodge et al. | |
| 2010/0194547 A1 | 8/2010 | Terrell et al. | |
| 2010/0214216 A1 | 8/2010 | Nasiri et al. | |
| 2010/0235729 A1 | 9/2010 | Kocienda et al. | |
| 2010/0281435 A1 | 11/2010 | Bangalore et al. | |
| 2010/0295781 A1 | 11/2010 | Alameh et al. | |
| 2010/0295799 A1 | 11/2010 | Nicholson et al. | |
| 2010/0298033 A1 | 11/2010 | Lee | |
| 2010/0306670 A1 | 12/2010 | Quinn et al. | |
| 2010/0328227 A1 | 12/2010 | Matejka et al. | |
| 2011/0115741 A1 | 5/2011 | Lukas et al. | |
| 2011/0193788 A1 | 8/2011 | King et al. | |
| 2011/0197153 A1 | 8/2011 | King et al. | |
| 2011/0221777 A1 | 9/2011 | Ke | |
| 2011/0239110 A1 | 9/2011 | Garrett et al. | |
| 2012/0092268 A1 | 4/2012 | Tsai et al. | |
| 2012/0092269 A1 | 4/2012 | Tsai et al. | |
| 2013/0335333 A1 | 10/2013 | Kukulski et al. | |

OTHER PUBLICATIONS

Bi, et al. "An Exploration of Pen Rolling for Pen-based Interaction", UIST '08 Proceedings of the 21st Annual ACM Sympiosium on User interface and Technology, Oct. 2008, 10 pages.

Mohamed, et al., "Disoriented Pen-Gestures for Identifying Users around the Tabletop without Cameras and Motion Sensors" Proceedings of the First IEEE International Workshop on Horizontal Interactive Human-Computer Systems (Tabletop '06), Jan. 2006, 8 pgs.

Mulroy, "N-Trig Pushes Pen and Multitouch Input", PC World, retrieved on Jan. 27, 2011 at <<http://www.pcworld.com/article/196723/ntrig_pushes_pen_and_multitouch_input.html>>, May 19, 2010, 3 pgs.

Ramos, et al., "Pressure Marks", CHI 2007 Proceedings of the SIGCHI Conference on Human Factors in Computing Systems, Apr.-May 2007, pp. 1375-1384.

Song et al., "Grips and Gestures on a Multi-Touch Pen", CHI 2011, May 7-12, 2011, Vancouver, BC, Canada, ACM, 10 pages.

Taylor, et al., "Graspables: Grasp-Recognition as a User Interface", CHI 2009 Proceedings of the 27th International Conference on Human Factors in Computing Systems, Apr. 2009, pp. 917-925.

"International Search Report", Mailed Date: Jul. 31, 2012, Application No. PCT/US2011/065680, Filed Date: Dec. 17, 2011, pp. 13.

Mark, et al., "GRMobile—A Framework or touch and accelerometer gesture recognition for mobile", IEEE, 2009, pp. 10.

Figueroa-Gibson, G., U.S. Office Action, U.S. Appl. No. 12/970,943, Nov. 6, 2013.

Traktovenko, Ilya, U.S. Notice of Allowance, U.S. Appl. No. 12/970,945, Oct. 16, 2013.

Aliakseyeu, D., A. Lucero, S. Subramanian, Interacting with piles of artifacts on digital tables, Digital Creativity, Jul. 2007, pp. 161-174, vol. 18, No. 3.

Ashbrook, et al., "MAGIC: A Motion Gesture Design Tool," retrieved at <<http://research.nokia.com/files/2010-Ashbrook-CHI10-MAGIC.pdf>>, Proceedings of the 28th International Conference on Human Factors in Computing Systems, Apr. 2010, 10 pages.

Babyak, Richard, "Controls & Sensors: Touch Tones", retrieved at <<http://www.appliancedesign.com/Articles/Controls_and_Displays/BNP_GUID_9-5-2006_A_10000000000000129366>>, Appliance Design, Jun. 30, 2007, 5 pages.

Balakrishnan, et al., "The Rockin'Mouse: Integral 3D Manipulation on a Plane", In Proceedings of the ACM SIGCHI Conference on Human Factors in Computing Systems, Mar. 22, 1997, 8 pages.

(56) References Cited

OTHER PUBLICATIONS

Bartlett, Joel F., "Rock 'n' Scroll is Here to Stay," accessed at <<http://www.hpl.hp.com/techreports/Compaq-DEC/WRL-2000-3.pdf>>, Western Research Laboratory, Palo Alto, California, May 2000, 9 pages.

Bjørneseth, et al., "Dynamic Positioning Systems—Usability and Interaction Styles," retrieved at <<http://www.ceng.metu.edu.tr/~tcan/se705__s0809/Schedule/assignment3.pdf>>, Proceedings of the 5th Nordic Conference on Human-Computer Interaction: Building Bridges, Oct. 2008, 10 pages.

Brandl, et al., "Combining and Measuring the Benefits of Bimanual Pen and Direct-Touch Interaction on Horizontal Interfaces", In Proceedings of the Working Conference on Advanced Visual Interfaces, May 28, 2008, 10 pages.

Buxton, William, "Chunking and Phrasing and the Design of Human-Computer Dialogues," retrieved at <<http://www.billbuxton.com/chunking.pdf>>, Proceedings of the IFIP World Computer Congress, Sep. 1986, 9 pages.

Buxton, William, "Lexical and Pragmatic Considerations of Input Structure," retrieved at <<http://acm.org>>, ACM SIGGRAPH Computer Graphics, vol. 17, Issue 1, Jan. 1983, pp. 31-37.

Buxton, William, "A Three-State Model of Graphical Input," Human-Computer Interaction—Interact '90, Aug. 1990, Amsterdam: Elsevier Science Publishers B.V. (North-Holland), pp. 449-456.

Card, et al., The Design Space of Input Devices, Computer Human Interaction, Apr. 1990, pp. 117-124, Seattle, WA, USA.

Chen, et al., "Navigation Techniques for Dual-Display E-Book Readers," retrieved at <<http://acm.org>>, CHI '08 Proceeding of the Twenty-Sixth Annual SIGCHI Conference on Human Factors in Computing Systems, Apr. 2008, pp. 1779-1788.

Cho, et al., "Multi-Context Photo Browsing on Mobile Devices Based on Tilt Dynamics," retrieved at <<http://acm.org>>, MobileHCI '07 Proceedings of the 9th International Conference on Human Computer Interaction with Mobile Devices and Services, Sep. 2007, pp. 190-197.

Chun, et al., "Virtual Shelves: Interactions with Orientation-Aware Devices," retrieved at <<http://acm.org>>, UIST'09, Oct. 2009, pp. 125-128.

Cohen, et al., "Synergistic Use of Direct Manipulation and Natural Language," retrieved at <<http://acm.org>>, CHI '89 Proceedings of the SIGCHI Conference on Human Factors in Computing Systems, Apr. 1989, pp. 227-233.

Dachselt, et al., "Throw and Tilt—Seamless Interaction Across Devices Using Mobile Phone Gestures", Proceedings of the 34th Graphics Interface Conference, May 2008, 7 pages.

Döring, et al., "Exploring Gesture-Based Interaction Techniques in Multi-Display Environments with Mobile Phones and a Multi-Touch Table", Proceedings of the Workshop on Coupled Display Visual Interfaces, May 25, 2010, pp. 47-54.

"DuoSense Pen, Touch & Multi-Touch Digitizer," retrieved at <<http://www.n-trig.com/Data/Uploads/Misc/DuoSense_Brochure_FINAL.pdf, May 2008, N-trig Ltd., Kfar Saba, Israel, 4 pages.

Edge, et al., "Bimanual Tangible Interaction with Mobile Phones," retrieved at <<http://research.microsoft.com/en-us/people/daedge/edgeteibimanual2009.pdf>>, Proceedings of the 3rd International Conference on Tangible and Embedded Interaction, Feb. 2009, pp. 131-136.

Eslambolchilar, et al., "Tilt-Based Automatic Zooming and Scaling in Mobile Devices—a state-space implementation," retrieved at <<http://www.dcs.gla.ac.uk/~rod/publications/EsIMur04-SDAZ.pdf>>, Proceedings of Mobile HCI2004: 6th International Conference on Human Computer Interaction with Mobile Devices, Springer, Sep. 2004, 12 pages.

Essl, et al., "Use the Force (or something)—Pressure and Pressure-Like Input for Mobile Music Performance," retrieved at <<http://www.deutsche-telekom-laboratories.de/~rohs/papers/Essl-ForceMusic.pdf>>, NIME 2010 Conference on New Interfaces for Musical Expression, Jun. 2010, 4 pages.

Fitzmaurice, et at., "Tracking Menus", In Proceedings of the 16th Annual ACM Symposium on User Interface Software and Technology, Nov. 2, 2003, 10 pages.

Frisch, et al., "Investigating Multi-Touch and Pen Gestures for Diagram Editing on Interactive Surfaces", In ACM International Conference on Interactive Tabletops and Surfaces, Nov. 23, 2009, 8 pages.

Grossman, et al., "Hover Widgets: Using the Tracking State to Extend the Capabilities of Pen-Operated Devices", In Proceedings of the SIGCHI Conference on Human Factors in Computing Systems, Apr. 22, 2006, 10 pages.

Harrison, et al., "Scratch Input: Creating Large, Inexpensive, Unpowered and Mobile Finger Input Surfaces," retrieved at <<http://acm.org>>, UIST '08 Proceedings of the 21st Annual ACM Symposium on User interface Software and Technology, Oct. 2008, pp. 205-208.

Harrison, et al., "Skinput: Appropriating the Body as an Input Surface," retrieved at <<http://acm.org>>, CHI '10 Proceedings of the 28th International Conference on Human Factors in Computing Systems, Apr. 2010, pp. 453-462.

Harrison, et al., "Squeeze me, Hold me, Tilt me! An Exploration of Manipulative User Interfaces", CHI '98 Proceedings of the SIGCHI Conference on Human Factors in Computing Systems, Apr. 1998, pp. 17-24, Los Angeles, California, USA.

Hassan, et al., "Chucking: A One-Handed Document Sharing Technique," T. Gross et al. (Eds.): Interact 2009, Part II, LNCS 5727, Aug. 2009, pp. 264-278.

Herot, et al., "One-Point Touch Input of Vector Information from Computer Displays," retrieved at <<http://acm.org>>, SIGGRAPH '78 Proceedings of the 5th Annual Conference on Computer Graphics and Interactive Techniques, 12(3), Aug. 1978, pp. 210-216.

Hinckley, et al., "Design and Analysis of Delimiters for Selection-Action Pen Gesture Phrases in Scriboli," retrieved at <<http://acm.org>>, CHI '05 Proceedings of the SIGCHI Conference on Human Factors in Computing Systems, Apr. 2005, pp. 451-460.

Hinckley, et al., "Direct Display Interaction via Simultaneous Pen + Multi-touch Input", Society for Information Display (SID) Symposium Digest of Technical Papers, May 2010, vol. 41, No. 1, Session 38, pp. 537-540.

Hinckley, et al., "Foreground and Background Interaction with Sensor-Enhanced Mobile Devices," retrieved at <<http://research.microsoft.com/en-us/um/people/kenh/papers/tochisensing.pdf>>, ACM Transactions on Computer-Human Interaction, vol. 12, No. 1, Mar. 2005, 22 pages.

Hinckley, et al., "Manual Deskterity: An Exploration of Simultaneous Pen + Touch Direct Input," retrieved at <<http://acm.org>>, CHI EA '10 Proceedings of the 28th of the International Conference, Extended Abstracts on Human Factors in Computing Systems, Apr. 2010, pp. 2793-2802.

Hinckley, et al., "Pen + Touch = New Tools", In Proceedings of the 23nd Annual ACM Symposium on User Interface Software and Technology, Oct. 3, 2010, 10 pages.

Hinckley, et al., Sensing Techniques for Mobile Interaction, ACM UIST 2000 Symp. on User interface Software and Technology, San Diego, California, Nov. 5, 2000, pp. 91-100.

Hinckley, Ken, "Synchronous Gestures for Multiple Persons and Computers", In Proceedings of the 16th Annual ACM Symposium on User Interface Software and Technology, Nov. 2, 2003, 10 pages.

Hinckley, et al., "Touch-Sensing Input Devices", In Proceedings of the SIGCHI Conference on Human Factors in Computing Systems, May 15, 1999, 8 pages.

Holmquist, et al., "Smart-Its Friends: A Technique for Users to Easily Establish Connections between Smart Artefacts", In Proceedings of the 3rd International Conference on Ubiquitous Computing, Sep. 30, 2001, 6 pages.

Hudson, et al. Whack Gestures: Inexact and Inattentive Interaction with Mobile Devices, In Proceedings of the 4th International Conference on Tangible, Embedded and Embodied Interaction (Cambridge, MA, Jan. 25-27, 2010). TEI '10. ACM, New York, NY. 109-112.

Iwasaki, et al., "Expressive Typing: A New Way to Sense Typing Pressure and Its Applications," retrieved at <<http://acm.org>>, CHI

(56) References Cited

OTHER PUBLICATIONS

'09 Proceedings of the 27th International Conference Extended Abstracts on Human Factors in Computing Systems, Apr. 2009, pp. 4369-4374.

Izadi, et al., "C-Slate: A Multi-Touch and Object Recognition System for Remote Collaboration using Horizontal Surfaces", Second Annual IEEE International Workshop on Horizontal Interactive Human-Computer System, Oct. 2007, pp. 3-10.

Josh, et al., "Image Deblurring Using Inertial Measurement Sensors," retrieved at <<http://acm.org>>, ACM Transactions on Graphics, vol. 29, No. 4, Article 30, Jul. 2010, 9 pages.

Kendrick, "ChromeTouch: Free Extension for Touch Tables", GigaOM, May 6, 2010, 9 pages.

Kim, et al., "Hand Grip Pattern Recognition for Mobile User Interfaces," 2006, IAAI'06 Proceedings of the 18th Conference on Innovative Applications of Artificial Intelligence, Jul. 16-20, 2006, vol. 2, pp. 1789-1794.

Kratz, et al., "Unravelling Seams: Improving Mobile Gesture Recognition with Visual Feedback Techniques," retrieved at <<http://acm.org>>, CHI '09 Proceedings of the 27th International Conference on Human Factors in Computing Systems, Apr. 2009, pp. 937-940.

Kurtenbach, et al., "Issues in Combining Marking and Direct Manipulation Techniques", In Proceedings of the 4th Annual ACM Symposium on User Interface Software and Technology, Nov. 11, 1991, 8 pages.

Lester, et al., ""Are You With Me?"—Using Accelerometers to Determine if Two Devices are Carried by the Same Person", In Proceedings of Second International Conference on Pervasive Computing, Apr. 21, 2004, 18 pages.

Li, et al., "Experimental Analysis of Mode Switching Techniques in Pen-Based User Interfaces", In Proceedings of the SIGCHI Conference on Human Factors in Computing Systems, Apr. 2, 2005, 10 pages.

Liao, et al., "PACER: Fine-grained Interactive Paper via Camera-touch Hybrid Gestures on a Cell Phone," <<retrieved at http://acm.org>>, CHI '10 Proceedings of the 28th International Conference on Human Factors in Computing Systems, Apr. 2010, pp. 2441-2450.

Malacria, et al., "Clutch-Free Panning and Integrated Pan-Zoom Control on Touch-Sensitive Surfaces: The CycloStar Approach," retrieved at <<http://www.malacria.fr/data/doc/pdf/cyclostar.pdf>>, Proceedings of the 28th International Conference on Human Factors in Computing Systems, Apr. 2010, 10 pages.

N-act Multi-Touch Gesture Vocabulary Set, retrieved date, Oct. 12, 2011, 1 page.

Oviatt, et al., "Toward a Theory of Organized Multimodal Integration Patterns during Human-Computer Interaction," retrieved at <<http://acm.org>>, ICMI '03 Proceedings of the 5th International Conference on Multimodal Interfaces, Nov. 2003, pp. 44-51.

Partridge, et al., "TiltType: Accelerometer-Supported Text Entry for Very Small Devices," retrieved at <<http://acm.org>>, UIST '02 Proceedings of the 15th Annual ACM Symposium on User Interface Software and Technology, Oct. 2002, pp. 201-204.

"PenLab: Itronix GoBook Duo-Touch," retrieved at <<http://pencomputing.com/frames/itronix_duotouch.html>>, retrieved on Jan. 31, 2012, Pen Computing Magazine, 3 pages.

Rahman, et al., "Tilt Techniques: Investigating the Dexterity of Wrist-based Input," retrieved at <<http://acm.org>>, CHI '09 Proceedings of the 27th international Conference on Human Factors in Computing Systems, Apr. 2009, pp. 1943-1952.

Ramos, et al., "Tumble! Splat! Helping Users Access and Manipulate Occluded Content in 2D Drawings", In Proceedings of the Working Conference on Advanced Visual Interfaces, May 23, 2006, 8 pages.

Rekimoto, et al., Tilting Operations for Small Screen Interfaces, UIST '96 Proceedings of the 9th Annual ACM Symposium on User Interface Software and Technology, Nov. 1996, pp. 167-168, ACM New York, NY, USA.

Roudaut, A., "TimeTilt: Using Sensor-Based Gestures to Travel trough Multiple Applications on a Mobile Device, Human-Computer Interaction—Interact 2009, 12th IFIP TC 13 International Conference Proceedings, Part II, Aug. 24-28, 2009, pp. 830-834, Uppsala, Sweden.

Sachs, et al., "3-Draw: A Tool for Designing 3D Shapes", In Journal of IEEE Computer Graphics and Applications, vol. 11, Issue 6, Nov. 1991, 9 pages.

"Samsung Exhibit II 4G review: Second time around," retrieved at <<http://www.gsmarena.com/samsung_exhibit_2_4g-review-685p5.php>>, GSMArena.com, Dec. 1, 2011, p. 5 of online article, 3 pages.

Schmidt, et al., Advanced Interaction in Context, HUC '99 Proceedings of the 1st International Symposium on Handheld and Ubiquitous Computing, Sep. 27-29, 1999, pp. 89-101, Springer-Verlag London, UK.

Schmidt, et al., "PhoneTouch: A Technique for Direct Phone Interaction on Surfaces", In Proceedings of the 23nd Annual ACM Symposium on User Interface Software and Technology, Oct. 3, 2010, 4 pages.

Schwarz, et al., "A Framework for Robust and Flexible Handling of Inputs with Uncertainty," retrieved at <<http://acm.org>>, UIST '10, Proceedings of the 23nd Annual ACM Symposium on User Interface Software and Technology, Oct. 2010, pp. 47-56.

Schwesig, et al., "Gummi: A Bendable Computer," retrieved at <<http://acm.org>>, CHI '04, Proceedings of the SIGCHI Conference on Human Factors in Computing Systems, Apr. 2004, pp. 263-270.

Sellen, et al., "The Prevention of Mode Errors through Sensory Feedback," retrieved at <<http://acm.org>>, Journal of Human-Computer Interaction, vol. 7, Issue 2, Jun. 1992, pp. 141-164.

Subramanian, et al., "Multi-layer interaction for digital tables," In Proc. of the 19th Annual ACM Symposium on User Interface Software and Technology, Oct. 15, 2006, pp. 269-272.

Suzuki, et al., "Stylus Enhancement to Enrich Interaction with Computers", In Proceedings of the 12th International Conference on Human-Computer Interaction: Interaction Platforms and Techniques, Jul. 22, 2007, 10 pages.

Thurott, Paul, "Windows XP Tablet PC Edition reviewed", Paul Thurrott's Supersite for Windows, Jun. 25, 2002, 7 pages.

Tian, et al., "The Tilt Cursor: Enhancing Stimulus-Response Compatibility by Providing 3D Orientation Cue of Pen", In Proceedings of the SIGCHI Conference on Human Factors in Computing Systems, Apr. 28, 2007, 4 pages.

Tian, et al., "Tilt Menu: Using the 3D Orientation Information of Pen Devices to Extend the Selection Capability of Pen-based User Interfaces", In Proceedings of the SIGCHI Conference on Human Factors in Computing Systems, Apr. 5, 2008, 10 pages.

"TouchPaint.java", The Android Open Source Project, 2007.

"Using Windows Flip 3D", retrieved at <<http://windows.microsoft.com/en-US/windows-vista/Using-Windows-Flip-3D>>, retrieved on Feb. 9, 2012, Microsoft Corporation, Redmond, WA, 1 page.

Verplaetse, C., "Inertial Proprioceptive Devices: Self-Motion-Sensing Toys and Tools", In IBM Systems Journal, vol. 35, Issue 3-4, Apr. 23, 2013, 12 pages.

Walker, Geoff, "Palm rejection on resistive touchscreens", Veritas et Visus, Nov. 2005, pp. 31-33.

Wigdor, et al., "Lucid-Touch: A See-through Mobile Device," Proceedings of the 20th Annual ACM Symposium on User Interface Software and Technology, Oct. 2007, pp. 269-278.

Wigdor, et al., "TiltText:Using Tilt for Text Input to Mobile Phones," retrieved at <<http://acm.org>>, UIST '03, Proceedings of the 16th Annual ACM Symposium on User Interface Software and Technology, Nov. 2003, pp. 81-90.

Williamson, et al., "Shoogle: Excitatory Multimodal Interaction on Mobile Devices," retrieved at <<http://acm.org>>, CHI '07, Proceedings of the SIGCHI Conference on Human factors in Computing Systems, Apr. 2007, pp. 121-124.

Wilson, et al., "XWand: UI for Intelligent Spaces", In Proceedings of the SIGCHI Conference on Human Factors in Computing Systems, Apr. 5, 2003, 8 pages.

Wu, et al., "Gesture Registration, Relaxation, and Reuse for Multi-Point Direct-Touch Surfaces", In Proceedings of the First IEEE International Workshop on Horizontal Interactive Human-Computer Systems, Jan. 5, 2006, 8 pages.

(56) References Cited

OTHER PUBLICATIONS

Yee, Ka-Ping, "Two-Handed Interaction on a Tablet Display", In Proceedings of Extended Abstracts on Human Factors in Computing Systems, Apr. 24, 2004, 4 pages.
Zelenik, et al., "Hands-On Math: A Page-Based Multi-Touch and Pen Desktop for Technical Work and Problem Solving", In Proceedings of the 23nd Annual Symposium on User Interface Software and Technology, Oct. 3, 2010, 10 pages.
Figueroa-Gibson, G., U.S. Office Action, U.S. Appl. No. 12/970,943, Jun. 10, 2013.
Ilya Traktovenko, U.S. Office Action, U.S. Appl. No. 12/970,945, Apr. 22, 2013.
Traktovenko, Ilya, U.S. Notice of Allowance, U.S. Appl. No. 12/970,945, Jul. 10, 2013.
Figueroa-Gibson, G., U.S. Office Action, U.S. Appl. No. 12/970,939, Jun. 5, 2013.
Figueroa-Gibson, G., U.S. Office Action, U.S. Appl. No. 12/970,939, Aug. 22, 2013.
Figueroa-Gibson, G., U.S. Office Action, U.S. Appl. No. 12/970,949, Jun. 21, 2013.
Treitler, D., U.S. Office Action, U.S. Appl. No. 13/327,794, Aug. 16, 2013.
Balakrishnan, et al., Digital tape drawing, Proceedings of the 12th Annual ACM Symposium on User Interface Software and Technology, ACM Symposium on User Interface Software and Technology, UIST '99, Nov. 7-10, 1999, pp. 161-169, Asheville, USA.
Brandl, et al., "Occlusion-aware menu design for digital tabletops", Proc. of the 27th Int'l Conf. on Human Factors in Computing Systems, CHI 2009, Extended Abstracts, Apr. 4-9, 2009, pp. 3223-3228, Boston, MA, USA.
Buxton, W., "Integrating the Periphery and Context: A New Model of Telematics Proceedings of Graphics Interface", May 1995, pp. 239-246.
Chu, et al., "Detail-preserving paint modeling for 3D brushes", Proc. of the 8th Int'l Symposium on Non-Photorealistic Animation and Rendering 2010, NPAR 2010, Jun. 7-10, 2010, pp. 27-34, Annecy, France.
Fitzmaurice, et al., "An Exploration into Supporting Artwork Orientation in the User Interface", Proc. of the CHI '99 Conf. on Human Factors in Computing Sys's: The CHI is the Limit, Pittsburgh, CHI 1999, May 15-20, 1999, pp. 167-174.
Guiard, et al., "Writing Postures in Left-Handers: Inverters are Hand-Crossers", Neuropsychologia, Mar. 1984, pp. 535-538, vol. 22, No. 4.
Hinckley, et al., "Codex: A dual screen tablet computer", Proc. of the 27th Int'l Conf. on Human Factors in Computing Sys's, CHI 2009, Apr. 4-9, 2009, pp. 1933-1942, Boston, MA, USA.
Kurtenbach, et al., "The design of a GUI paradigm based on tablets, two-hands, and transparency", Proceedings of the ACM SIGCHI Conference on Human factors in computing systems, CHI 1997, Mar. 1997, pp. 35-42.
Lee, et al., "HandSCAPE: A vectorizing tape measure for on-site measuring applications", Proceedings of the CHI 2000 Conference on Human factors in computing systems, CHI 2000, Apr. 1-6, 2000, pp. 137-144, The Hague, The Netherlands.

Luff, et al., Mobility in Collaboration, Proceedings of the ACM 1998 Conference on Computer Supported Cooperative Work, CSCW 1998, Nov. 14-18, 1998, pp. 305-314, Seattle, WA, USA.
Mahony, et al., Nonlinear Complementary Filters on the Special Orthogonal Group, IEEE Trans. Automat. Contr., Jun. 2008, pp. 1203-1218, vol. 53, No. 5.
Mason, et al., "Grip Forces When Passing an Object to a Partner", Exp. Brain Res., May 2005, vol. 163, No. 2, pp. 173-187.
Premerlani, et al., Direction Cosine Matrix IMU: Theory, retrieved from gentlenav.googlecode.com/files/DCMDraft2.pdf, May 2009, pp. 1-30.
Siio, et al., "Mobile Interaction Using Paperweight Metaphor", Proc. of the 19th Annual ACM Symposium on User Interface Software and Technology, UIST '06, Oct. 2006, pp. 111-114, Montreux, Switzerland.
Wimmer, et al., HandSense: Discriminating Different Ways of Grasping and Holding a Tangible User Interface, Proceedings of the 3rd International Conference on Tangible and Embedded Interaction, TEI '09, Feb. 2009, pp. 359-362, Cambridge, UK.
Figueroa-Gibson, Gloryvid, U.S. Final Office Action, U.S. Appl. No. 12/970,949, Nov. 29, 2013, pp. 1-24.
Figueroa-Gibson, Gloryvid, U.S. Office Action, U.S. Appl. No. 12/970,949, Mar. 13, 2014, pp. 1-29.
Figueroa-Gibson, Gloryvid, U.S. Office Action, U.S. Appl. No. 12/970,943, Mar. 13, 2014, pp. 1-25.
Figueroa-Gibson, Gloryvid, U.S. Office Action, U.S. Appl. No. 12/970,939, Dec. 19, 2013, pp. 1-28.
Figueroa-Gibson, Gloryvid, U.S. Final Office Action, U.S. Appl. No. 12/970,939, May 30, 2014, pp. 1-32.
Treitler, Damon, U.S. Final Office Action, U.S. Appl. No. 13/327,794, Dec. 19, 2013, pp. 1-16.
Geisey, Adam, U.S. Office Action, U.S. Appl. No. 13/367,377, Feb. 13, 2014, pp. 1-11.
Traktovenko, Ilya, U.S. Office Action, U.S. Appl. No. 13/530,015, Jul. 18, 2014, pp. 1-26.
Figueroa-Gibson, Gloryvid, U.S. Final Office Action, U.S. Appl. No. 12/970,949, Aug. 15, 2014, pp. 1-21.
Figueroa-Gibson, Gloryvid, U.S. Office Action, U.S. Appl. No. 12/970,943, Sep. 17, 2014, pp. 1-20.
Figueroa-Gibson, Gloryvid, U.S. Office Action, U.S. Appl. No. 12/970,939, Oct. 2, 2014, pp. 1-40.
Treitler, Damon, U.S. Office Action, U.S. Appl. No. 13/327,794, Jul. 17, 2014, pp. 1-13.
Geisy, Adam, U.S. Final Office Action, U.S. Appl. No. 13/367,377, Jul. 1, 2014, pp. 1-12.
Traktovenko, Ilya, U.S. Final Office Action, U.S. Appl. No. 13/530,015, Nov. 19, 2014, pp. 1-48.
Figueroa-Gibson, Gloryvid, U.S. Notice of Allowance, U.S. Appl. No. 12/970,943, Dec. 19, 2014, pp. 1-10.
Figueroa-Gibson, Gloryvid, U.S. Notice of Allowance, U.S. Appl. No. 12/970,939, Dec. 19, 2014, pp. 1-10.
Treitler, Damon, U.S. Final Office Action, U.S. Appl. No. 13/327,794, Nov. 20, 2014, pp. 1-13.

* cited by examiner

MULTI-TOUCH INPUT DEVICE WITH ORIENTATION SENSING

BACKGROUND

Input devices are used to control a variety of electronic devices. For example, keyboards and mice are used to provide input to computers, while controllers are used to provide input to game consoles, televisions, and other entertainment devices. However, the usage paradigms for input devices have generally changed little. A user generally first selects a particular input device that controls an electronic device, and then uses the particular input device to send a control command to the electronic device. However, the performance of certain complex tasks may involve the user learning to use and switching between multiple input devices.

SUMMARY

Described herein are techniques for using a multi-touch input device that is equipped with an orientation sensor to perform multiple tasks. The multi-touch input device may have the ability to detect a grip pattern that is used by a user to hold and manipulate the input device. The grip pattern may include a particular hand grip that the user uses to hold the input device and the orientation of the input device in the user's hand. In turn, the multi-touch input device may act as different tools or perform different functions in response to the way the multi-touch input device is gripped and oriented by a user.

The multi-touch orientation sensing input device may enhance the task performance efficiency of the user by making it possible to perform different tasks with a single input device, instead of with the use of multiple input devices. Further, since the user may switch the multi-touch orientation sensing input device from performing one function to another function by simply changing the grip pattern, a user learning curve associated with mastering the use of new input devices may be reduced. Additionally, since the use of the multi-touch orientation sensing input device does not force the user to hold the input device in unnatural ways, user comfort and perceived quality of the input device may be improved.

In at least one embodiment, a multi-touch orientation sensing input device may include a device body that is partially or completely enclosed by a multi-touch sensor. The multi-touch orientation sensing input device may further include an inertia measurement unit that is disposed on the device body. The inertia measurement unit may measure a tilt angle of the device body with respect to a horizontal surface, as well as a roll angle of the device body along a length-wise axis of the device body with respect to an initial point on the device body.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
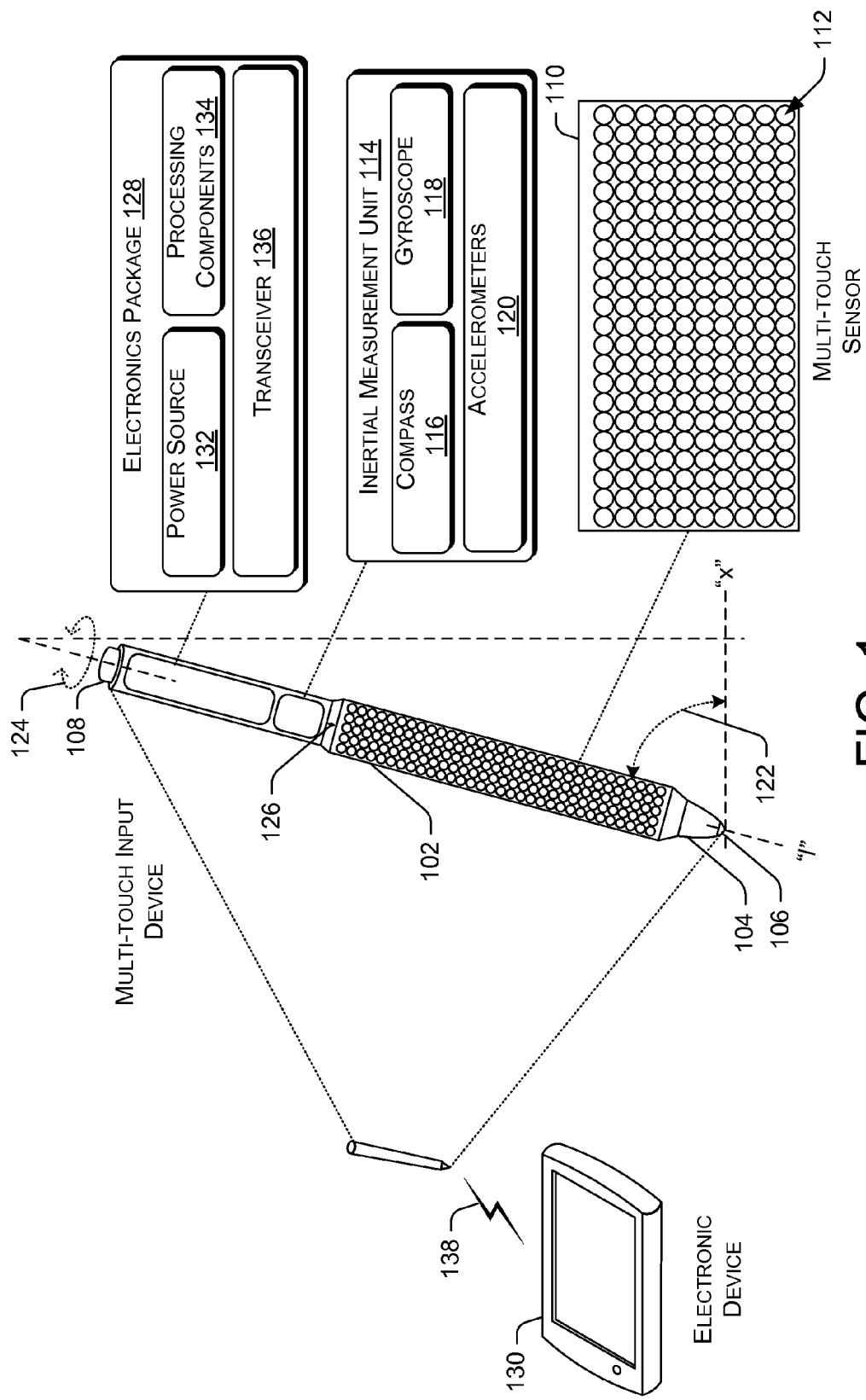
FIG. 1 is an illustrative diagram showing example components of a multi-touch orientation sensing input device.

The embodiments described herein pertain to the use of a multi-touch input device that is equipped with a multi-touch sensor and an orientation sensor to perform multiple tasks. The multi-touch input device may have the ability to detect the grip pattern that is used by a user to hold and manipulate the input device. The grip pattern may include a particular hand grip that the user uses to hold the input device and an orientation of the input device in the user's hand. In turn, the multi-touch input device may act as different tools, or perform different functions in response to the way the multi-touch input device is gripped and oriented by a user.

For instance, the multi-touch orientation sensing input device may be paired with an electronic device that is an electronic drawing tablet. In such an instance, the different ways that the input device is gripped and oriented by the user may cause the multi-touch orientating sensing input device to act as different digital writing and drawing tools. For example, depending on the particular grip pattern, the multi-touch orientation sensing input device may function as one of a digital paint brush, a digital sketch pen, a digital eraser, and so forth. In a further instance, information regarding the grip pattern may be analyzed in conjunction with the orientation of the electronic device to determine the function of the input device.

In other instances, the multi-touch orientation sensing input device may be paired with another input processing device that is a game console. In such instances, the different ways that the input device is gripped and oriented by the user may cause the multi-touch orientation sensing device to act as different game controllers. For example, depending on the particular grip pattern, the multi-touch orientation sensing input device may function as a martial arts staff, a ball racquet, an edged weapon, a gun, and so forth.

In additional instances, the multi-touch orientation sensing input device may detect a series of grip pattern changes and feed the series to an electronic device. Accordingly, rather than determine a command associated with a single grip pattern, the electronic device may analyze the entire series of grip patterns to determine a function. For example, while gripping the multi-touch orientation sensing input device, the user may simultaneously tap his or her fingers on the input device in a particular sequence. As such, the electronic device may interpret the sequence as a corresponding command to perform a function (e.g., performing a copy function in a word processing application, start a new game, play music notes), and may perform the function accordingly.

In various embodiments, the multi-touch orientation sensing input device may be rod-like in shape so that the input device may be easily grasped by the hand of the user. The outside of the input device may be at least partially covered with a multi-touch sensor that detects the different grip patterns of the user. For example, the multi-touch sensor may sense a grip pattern that is in the form of palm and fingers impressions of the user. The multi-touch orientation sensing input device may further include an orientation sensor that is able to sense the movement of the input device within a three-dimensional space.

The multi-touch orientation sensing input device may enhance the task performance efficiency of the user by making it possible to perform different tasks with a single input device, instead of with the use of multiple input devices or controllers. Further, since the user may switch the multi-touch orientation sensing input device from performing one function to another function by simply changing a combination of grip pattern and device orientation, a user learning curve associated with mastering the use of new input devices may be reduced. Additionally, since the use of the multi-touch orientation sensing input device does not force the user to hold the input device in unnatural ways, user comfort and perceived quality of the device may be improved. Various examples of the multi-touch orientation sensing input device and example techniques for using the input device in accordance with the embodiments are described below with reference to FIGS. 1-15.

Example Multi-Touch Orientation Sensing Input Device

FIG. 1 is an illustrative diagram showing the example components of a multi-touch orientation sensing input device 102. The input device 102 may be rod-like in shape so that the input device may be easily grasped by the hand of a user. In some embodiments, the input device 102 may be shaped like a stylus or pen, with a taper end 104. The taper end 104 may include a retractable tip 106 that activates a pressure switch housed in the input device 102. The pressure switch may output a signal when sufficient pressure actuates the switch.

In other embodiments, the body of the input device 102 may also be equipped with at least one button, such as a clickable button 108, which activates a corresponding pressure switch when depressed.

The body of the input device 102 may be partially or completely covered with a multi-touch sensor 110. The multi-touch sensor 110 may detect contact between one or more conductive objects (e.g., different hand parts of a user) and the body of the input device 102. In some embodiments, the multi-touch sensor 110 may be a capacitive sensor that includes a membrane of capacitive sensing elements 112 in which each element converts a contact by a conductive object into a corresponding electrical signal. The membrane of capacitive sensing elements 112 may be enclosed within a protective coating that prevents direct electrical contact between the hand of the user and the sensing elements. In some instances, the protective coating may be an elastic material that also provides cushioning properties. The capacitive sensing elements 112 may be organized as a sensor grid that is capable of tracking multiple simultaneous touches on the body of the input device 102 and provide two-dimensional locations of the touches. As further described below, such capability of the capacitive sensing elements 112 may be used to form multi-touch input images. In other embodiments, the multi-touch sensor 110 may be a resistive sensor or a pressure switch that is also capable of detecting contacts between one or more conductive objects and the body of the input device 102 for the purpose of forming multi-touch input images.

An inertia measurement unit 114 may be positioned on or inside the body of the input device 102. The inertia measurement unit 114 may detect and report the orientation and movement of the input device 102. In various embodiments, the inertia measurement unit 114 may include a compass 116, a gyroscope 118, and one or more accelerometers 120. The inertia measurement unit 114 may measure and output a pitch, that is, a tilt angle 122 of the input device 102. The tilt angle 122 of the input device 102 is the angular difference between an axis "1" along the length of the input device 102 and a horizontal surface "x". For example, an input device 102 that is perpendicular to a horizontal surface may have a tilt angle of 90°, while an input device 102 that is parallel to a horizontal surface may have a tilt angle of 0°.

The inertia measurement unit 114 may also measure and output a roll angle 124 of the input device 102. The roll angle 124 is the rotational angle of the input device 102 as it spins along the "1" axis. An initial roll angle 124 of 0° may be fixed with respect to an arbitrary point 126 on the body of the input device 102. Subsequently, any spin of the input device 102 along the "1" may either increase or decrease the roll angle with respect to this arbitrary point 126 independent of the tilt angle 122.

The input device 102 may also include an electronics package 128 that powers the multi-touch sensor 110 and the inertia measurement unit 114. The electronic package 128 may also pass the output data of the multi-touch sensor 110 and the inertia measurement unit 114 to an electric device 130. The electronics package 128 may include a power source 132, processing components 134, and a transceiver 136. The power source 132 may be a self-contained battery and/or an electrical component that feeds electrical power to the multi-touch sensor 110 and the inertia measurement unit 114 from another power source. For example, the input device 102 may be electrically hardwired to the electronic device 130, and the power source 132 may be a component that regulates the flow of electrical power from the electronic device 130 to the input device 102 through the wired connection.

The processing components 134 may include hardware and/or software that obtain the outputted data from the multi-touch sensor 110, the inertia measurement unit 114, as well as the pressure switches that are associated with the retractable tip 106 and the clickable button 108. In turn, the processing components 134 may transform the data into a format that is readily received and understood by the electronic device 130. For example, the processing components 134 may convert analogy signals into digital data, or vice versa. In another example, the processing components 134 may encode the data into a data format that is specified by the electronic device 130. Any software that is included in the processing components 134 may be stored in a memory. The memory may include computer readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a electronic device. In contrast, communication media may embody computer readable instructions, data structures, program modules, or other data in a modulated data signal, such as a carrier wave, or other transmission mechanism. As defined herein, computer storage media does not include communication media.

The transceiver 136 may include wireless or wired communication components that enable the input device 102 to transmit data to and receive data from the electronic device 130 via a wireless or wired connection 138. For example, the transceiver 136 may be a Bluetooth® transceiver, or a universal serial bus (USB) transceiver.

The electronic device 130 may be a general purpose computer, such as a desktop computer, a tablet computer, a laptop computer, and so forth. In other embodiments, the electronic device 130 may be one of a smart phone, a game console, a personal digital assistant (PDA), a drawing tablet, and so forth. The electronic device 130 may interpret the input received from the input device 102 as commands, and perform function based on the commands. As further described below, the commands may cause the electronic device 130 to perform different functions.

Example Electronic Device Components

Figure 2:
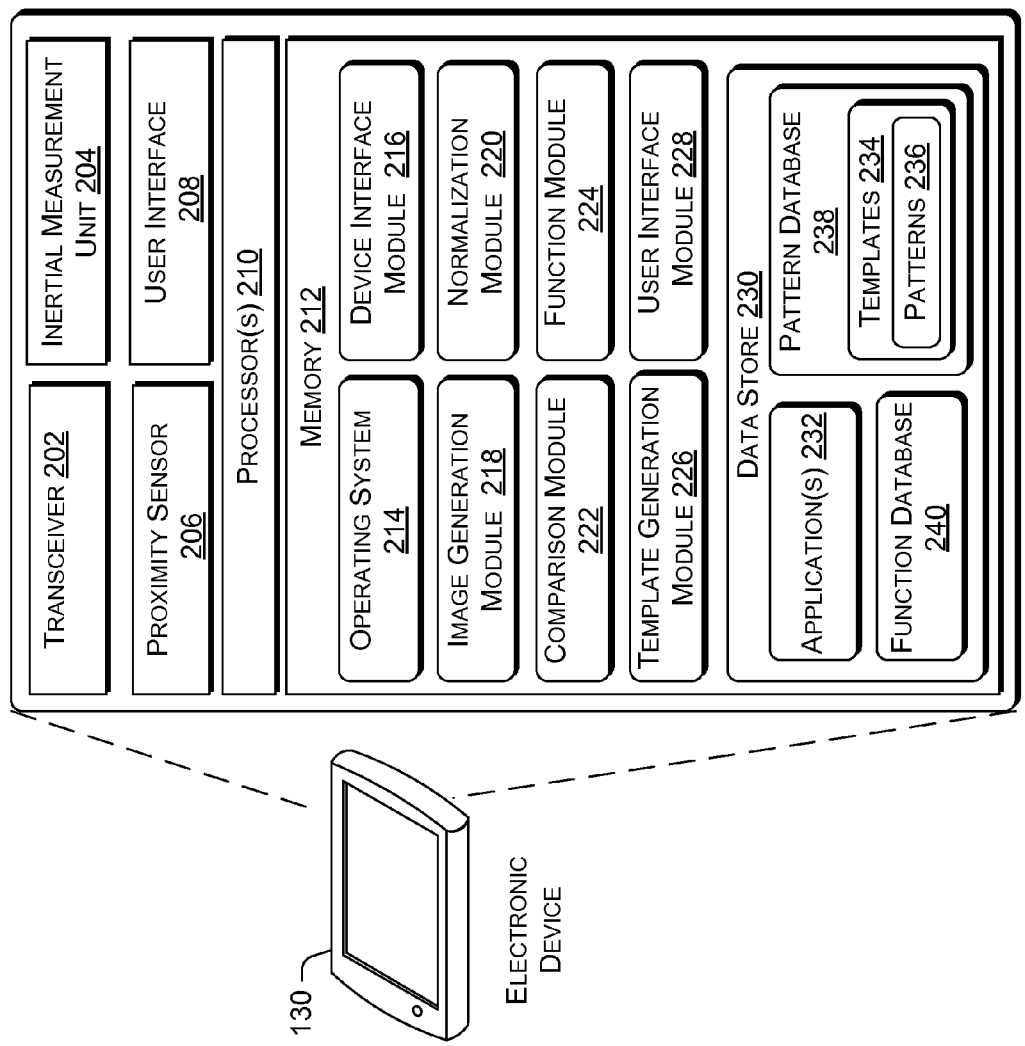
FIG. 2 is a block diagram that illustrates selected components of an electronic device that is paired with the multi-touch orientation sensing input device.

FIG. 2 is a block diagram that illustrates selected components of an electronic device 130 that is paired with the multi-touch orientation sensing input device. The electronic device 130 may include a transceiver 202, an inertial measurement unit 204, a proximity sensor 206, user interfaces 208, one or more processors 210, and memory 212.

The transceiver 202 may include wireless and/or wired communication components that enable the electronic device 130 to transmit data to and receive data from the multi-touch orientation sensing input device 102 via a wireless and/or wired connection 138. For example, the transceiver 202 may be a Bluetooth® transceiver or a universal serial bus (USB) transceiver.

The inertial measurement unit 204 may detect and report the orientation and movement of the electronic device 130. For example, the inertial measurement unit 204 may detect a tilt of the electronic device 130 with respect to a horizontal surface, a rotation of the electronic device 130, and so forth. In various embodiments, the inertial measurement unit 204 may be similar to the inertial measurement unit 204 that is embedded in the multi-touch orientation sensing input device 102.

The proximity sensor 206 may detect the movements of the input device 102 proximate to the electronic device 130. The proximity sensor 206 may detect movements of the multi-touch orientation sensing input device 102 in one or more dimensions using different detection techniques, or a combination of different detection techniques. These detection techniques may include image recognition and tracking, electromagnetic induction sensing, infrared ranging, acoustic ranging, laser ranging, capacitive or resistive touch sensing, and/or other technologies. In some embodiments, the proximity sensor 206 may include an electromagnetic digitizer having a flat surface that senses the movement of the input device 102 without direct contact, and on which the user may activate the pressure switch associated with the retractable tip 106 of the input device 102. In other embodiments, the digitizer may have a flat surface that uses capacitive or resistive contact sensing to detect the movement of the input device 102.

The user interface 208 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices. In at least one embodiment, the output devices may include a display screen that presents data corresponding to the movement of the input device 102 as detected by the proximity sensor 206. In some embodiments, the display screen and the digitizer may be integrated into a single unit that both detects and display the movements of the multi-touch orientation sensing input device 102.

The memory 212 may be implemented using computer readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a electronic device. In contrast, communication media may embody computer readable instructions, data structures, program modules, or other data in a modulated data signal, such as a carrier wave, or other transmission mechanism. As defined herein, computer storage media does not include communication media.

The one or more processors 210 and memory 212 of the electronic device 130 may implement an operating system 214, a device interface module 216, an image generation module 218, a normalization module 220, a comparison module 222, a function module 224, a template generation module 226, a user interface module 228, and a data store 230. The modules of the electronic device 130 may process the data from the multi-touch sensor 110, the inertia measurement unit 114, as well as the pressure switches that are associated with the retractable tip 106 and the clickable button 108. In turn, the modules of the electronic device 130 may determine the different functions that a user desires the multi-touch orientation sensing input device 102 to perform in various scenarios.

The operating system 214 may include at least one operating system that enables the electronic device 130 to receive data via various inputs (e.g., user controls, network interfaces, and/or memory devices), and processes data using the one or more processors 210 to generate output. The operating system may also include a display function that presents the output (e.g., displays the output on an electronic display, stores data in memory, transmits data to another electronic device, etc.). The operating system may further provide resources and services for the implementation and execution of various modules and applications, such as the applications 232 stored in the data store 230. Additionally, the operating system may perform various other functions generally associated with such a system, such as enabling a user to interact with the various modules on the electronic device 130 and the applications 232 using the user interface 208. Nevertheless, in some embodiments, the modules and the applications 232 stored in the memory 212 may be configured to function without the operating system 214.

The device interface module 216 may enable the other modules of the electronic device 130 to exchange data with other wireless devices via the transceiver 202. The device interface module 216 may include software that facilitates the operations of the transceivers 202 (e.g., protocol layer, network layer, link layer, transport layer, application layer, session layer, encryption layer, and/or the like). In some embodiments, the device interface module 216 may detect the input device 102 by broadcast an identifier signal, and monitor for reply signals from the input device 102 for establishing a communication connection. In other embodiments, the device interface module 216 may monitor for identifier signals from the input device 102, and transmit reply signals to establish a communication connection. Accordingly, once the communication connection is established, the device interface module 216 may transmit output data that is generated by the various modules of the electronic device 130 to the multi-touch orientation sensing input device 102, as well as receive input data from the input device 102.

The image generation module 218 may receive data associated with different instances of touches with the multi-touch sensor 110 of the input device 102, depending on the particular patterns of capacitive sensing elements 112 that are triggered in the different instances. In turn, the image generation module 218 may process the data into corresponding representative multi-touch input images. Each of the images may include one or more image areas that represent where contact by a body part, e.g., a hand of the user with the multi-touch sensor 110 occurred, as well as image areas that represent the lack of contact with the multi-touch sensor 110. As further described below, each of the multi-touch input images may be further compared with grip templates 234 that are stored in the data store 230. Since each of the grip templates 234 already corresponds to a particular grip pattern, the grip captured in each of the multi-touch input images may be deduced by using the grip templates 234. The initial generation of a multi-touch input image from data received from the input device 102 is illustrated in FIG. 3.

Figure 3:
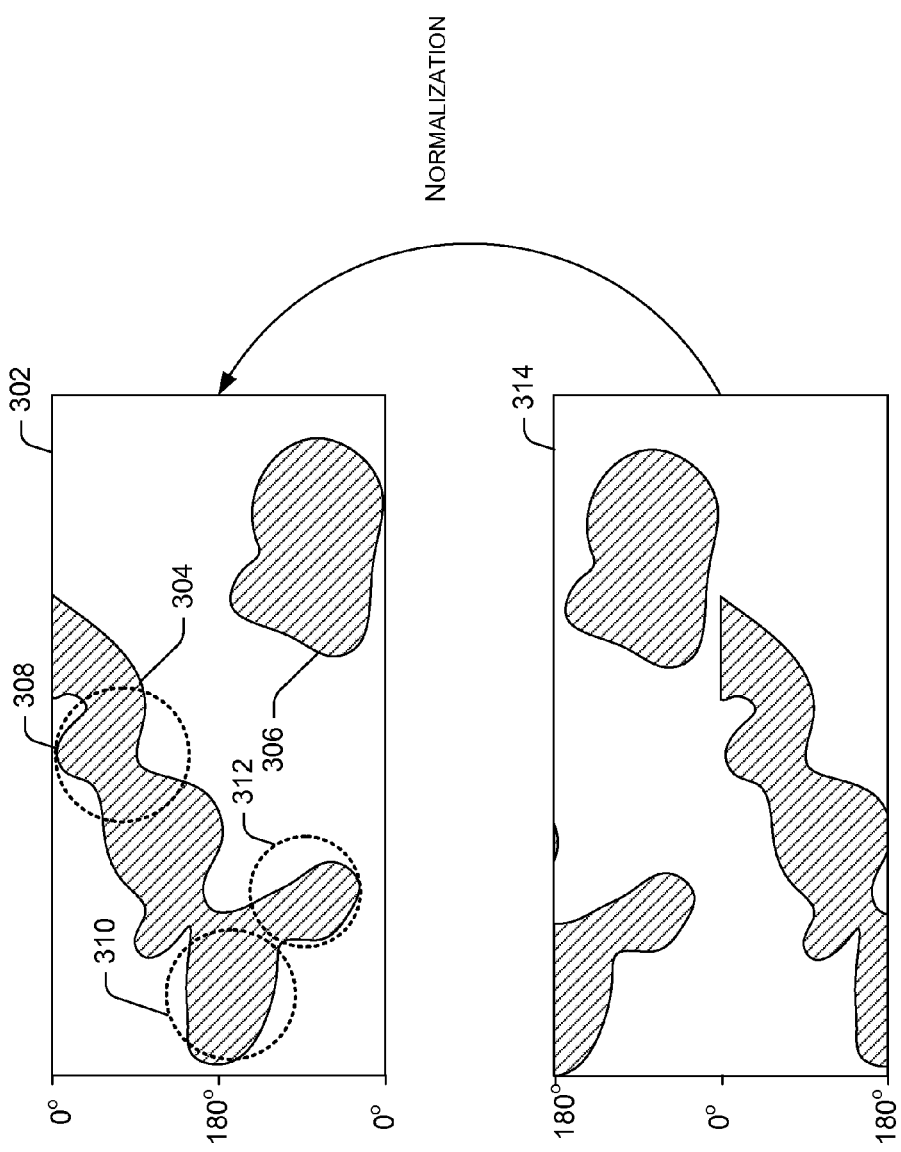
FIG. 3 is a schematic diagram that illustrates an example conversion of data from the multi-touch sensor of a multi-touch orientation sensing input device into a corresponding multi-touch input image.

FIG. 3 is a schematic diagram that illustrates an example conversion of data from the multi-touch sensor of a multi-touch orientation sensing input device into a corresponding multi-touch input image. As shown, the image generation module 218 may generate an example two-dimensional multi-touch input image 302 from data received from the multi-touch sensor 110. The generation of the multi-touch input image 302 may be conceptualized as slicing the three-dimensional data from the multi-touch sensor 110 at some point along the "1" axis, flattening the three-dimensional data, and expressing the data as a two-dimensional image. In some embodiments, the example multi-touch input image 302 may be further blurred with a Gaussian function or similar image blurring functions to increase recognition rate during the eventual image comparison with the grip template 234.

As shown, the example multi-touch input image 302 may include an image area 304 and an image area 306 that represent where at least some contact between objects (e.g., different hand parts of a user) and at least some sensor elements 112 on the body of the input device 102 occurred. For example, in the context of the input device 102 being gripped by the hand of a user, region 308 of the image area 304 may represent a contact impression between a thumb of the user and the body of the input device 102. Likewise, region 310 may represent a contact impression between an index finger of the user and the body of the input device 102, while region 312 may represent a contact impression between a middle finger of the user and the body of the input device 102. Further, the image 306 may represent a contact impression between a web of the user's hand and the body of the input device 102.

The image generation module 218 may further use a normalization module 220 to normalize each of the multi-touch input images based on differences between their respective roll angles and a standardized roll angle. In such embodiments, the image generation module 218 may further capture an associated roll angle of the input device 102 as the image generation module 218 receives the multi-touch sensor data from the input device 102. Image normalization according to roll angle compensates for the fact that the body of the input device 102 may have a different rotational orientation along the "1" axis with respect to the hand of the user each time the user handles the multi-touch orientation sensing input device 102. For example, in an instance in which the body of the input device 102 is cylindrical and has a line of imprinted writing (e.g., brand name) parallel to the "1" axis, the user may pick up and hold the input device 102 repeatedly without regard to whether the writing is visible or covered by the user's hand. Nevertheless, in such scenarios, the inertial measurement unit 114 of the input device 102 may record different roll angles each time the input device 102 is picked up and held (e.g., 0°, 120°, 180°, −45°, and so forth).

Accordingly, the normalization module 220 may use the corresponding roll angles of the multi-touch input images to normalize the images. For example, as shown in FIG. 3, the multi-touch input image 302 may be generated by the image generation module 218 when the user picked up the input device 102 for a first time at a roll angle of 0°. As such, the top and bottom of the multi-touch input image 302 may correspond to 0°, while the middle of the multi-touch input image 302 may correspond to 180°.

On the other hand, the multi-touch input image 314 may be generated by the image generation module 218 when the user picked up the input device for a second time at a roll angle of 180°. As such, the top and bottom of the multi-touch input image 302 may correspond to 180°, while the middle of the multi-touch input image 302 may correspond to 0°. The user may have used the same grip both the first time and the second time, but the resultant multi-touch input images are different without normalization due to the difference in roll angles.

In such an instance, assuming that the normalization module 220 is configured to normalize all images according to a standardized roll angle of 0°, the normalization module 220 may rotate the multi-touch input image 314 so that the top and bottom of the multi-touch input image 314 correspond to 0°, while the middle of the multi-touch input image 314 correspond to 180°. Subsequently, the multi-touch input image 302 and the multi-touch input image 314 may then be directly compared to determine if they match. In some embodiments, the normalization module 220 may use linear transformation and/or linear translation techniques to rotate the multi-touch input images according to the difference between the roll angle of the multi-touch input image 314 and the standardized roll angle. It will be appreciated that while the normalization example illustrated in FIG. 3 is discussed in the context of roll angle 0°, the normalization module 220 may normalize the multi-touch input images according to any arbitrary standardized roll angle in other embodiments.

Returning to FIG. 2, the comparison module 222 may compare and match the normalized multi-touch input images to grip templates 234. Each of the grip templates 234 may include a particular pre-stored multi-touch input image that is normalized to the standardized roll angle, as well as a specific tilt angle that corresponds to the particular pre-stored multi-touch image. The particular pre-stored multi-touch image may represent a particular grip that the user uses to grip the input device 102. The specific tilt angle may be a tilt angle of an input device, such as the multi-touch orientation sensing input device 102, at the time that the input device provided the particular pre-stored multi-touch input image. Accordingly, a combination of a grip represented by a multi-touch image included in a grip template 234 and the specific tilt angle of the input device at the time the multi-touch image is captured may constitute a grip pattern. As such, multiple grip templates 234 may share the same multi-touch image, but have entirely different tilt angles. The grip templates 234 that include the corresponding multi-touch input images and tilt angles, and their associated grip patterns 236 may be stored in a pattern database 238.

In various embodiments, the comparison module 222 may match a normalized multi-touch input image with an associated tilt angle to a grip template 234 using a classification algorithm. The associate tilt angle may be the tilt angle 122 of the multi-touch orientation sensing input device 102 at the time the data input for the normalized multi-touch input image was captured by the multi-sensor 110.

The comparison module 222 may initially obtain a weighted sum of difference for the normalized multi-touch input image and each of the grip templates 234. Each weighted sum of difference may include (1) the image difference between the normalized multi-touch input image and a particular template; and (2) the tilt angle difference between the associated tilt angle of the normalized multi-touch input image and a specific tilt angle of the particular template. Subsequently, the comparison module 222 may use a k-nearest neighbor (K-NN) algorithm to determine a grip template from the grip templates 234 that is the closest match to the normalized multi-touch input image based on the obtained weighted sums.

Thus, by performing such comparisons using the weighted sums, the comparison module 222 may identify a grip pattern that corresponds to the new normalized multi-touch input image and its associated tilt angle. Subsequently, the comparison module 222 may assign the corresponding identified grip pattern to the new normalized multi-touch input image with the associated tilt angle. Conversely, if no match between the new normalized multi-touch input image with the associated tilt angle and any of the grip templates 234 is found, the comparison module 222 may discard the new normalized multi-touch input image and/or process the next available normalized multi-touch input image that has another associated tilt angle. In some embodiments, the comparison module 222 may present a message to the user via the user interface module 228 that indicates that no grip pattern is detected and/or direct the user to modify the input device 102 is being held.

In various embodiments, the comparison module 222 may employ various classification schemes (explicitly and/or implicitly trained) and/or systems (e.g., support vector machines, neural networks, expert systems, Bayesian belief networks, fuzzy logic, data fusion engine, and/or the like) to perform the comparison and matching based on the normalized images and the tilt angles.

The function module 224 may determine functions that are to be performed based on the inputs received from one or more multi-touch orientation sensing input device 102, and/or the orientation of the electronic device 130. The inputs obtained from an input device 102 may include one or more detected grip patterns, detected roll angles 124, detected activations of the retractable tip 106, and/or detected activations of one or more clickable buttons, such as the clickable button 108. The inputs obtained from the electronic device 130 may include device roll angle, i.e., rotation of the device, and device tilt angle from the inertial measurement unit 204, and input device 102 movement data from the proximity sensor 206. In various embodiments, the function module 224 may determine one or more functions to be performed using a function database 240 that correlates specific combinations of the one or more inputs from the input device 102 and the electronic device 130 to different functions.

In additional embodiments, the function module 224 may also provide a user interface via the user interface module 228 that enables a user add, delete, or modify the function database 240. In other words, the user interface provided by the function module 224 may enable the user to add entries that associate particular functions with specific combinations of one or more inputs from the input device 102 and/or electronic device 130, as well as modify or delete those entries. In some embodiments, the function module 224 may be part of an application, such as one of the applications 232, rather than a standalone module. Examples of functions that are determined by the function module 224 are illustrated in FIGS. 4-12.

The template generation module 226 may be used by the user to generate the normalized grip templates 234. For example, the template generation module 226 may provide a user interface via the user interface module 228 that enables a user to associate different multi-touch input images with corresponding grip patterns and tilt angles. In some embodiments, in order to decrease the amount of template data, the template generation module 226 may prevent the user from associating each new multi-touch input image with a new grip pattern until the template generation module 226 determines that the image difference between each new multi-touch input image and previously inputted multi-touch input images exceeds a predetermined difference threshold. In such embodiments, the template generation module 226 may employ the comparison module 222 to ascertain differences between multi-touch input images.

The user interface module 228 may enable the user to interact with the other modules that are stored in the memory 212. In various embodiments, the user interface module 228 may generate user interface menus and/or indicators according to the instructions of the other modules that are stored in the memory 212. The user interface module 228 may also receive and process user inputs entered according to the user interface menus and/or indicators. In some embodiments, the user interface module 228 may be an integral part of the operating system 214.

The data store 230 may store data used by the modules that are stored in the memory 212. In various embodiments, the data store may store the applications 232 and the pattern database 238. The pattern database 238 may be downloaded to the data store 230 from an external source, or created using the template generation module 226. The data store 230 may also store the function database 240, as well as the inputs from the various sensors of the multi-touch orientation sensing input device 102 and the electronic device 130.

Figure 4:
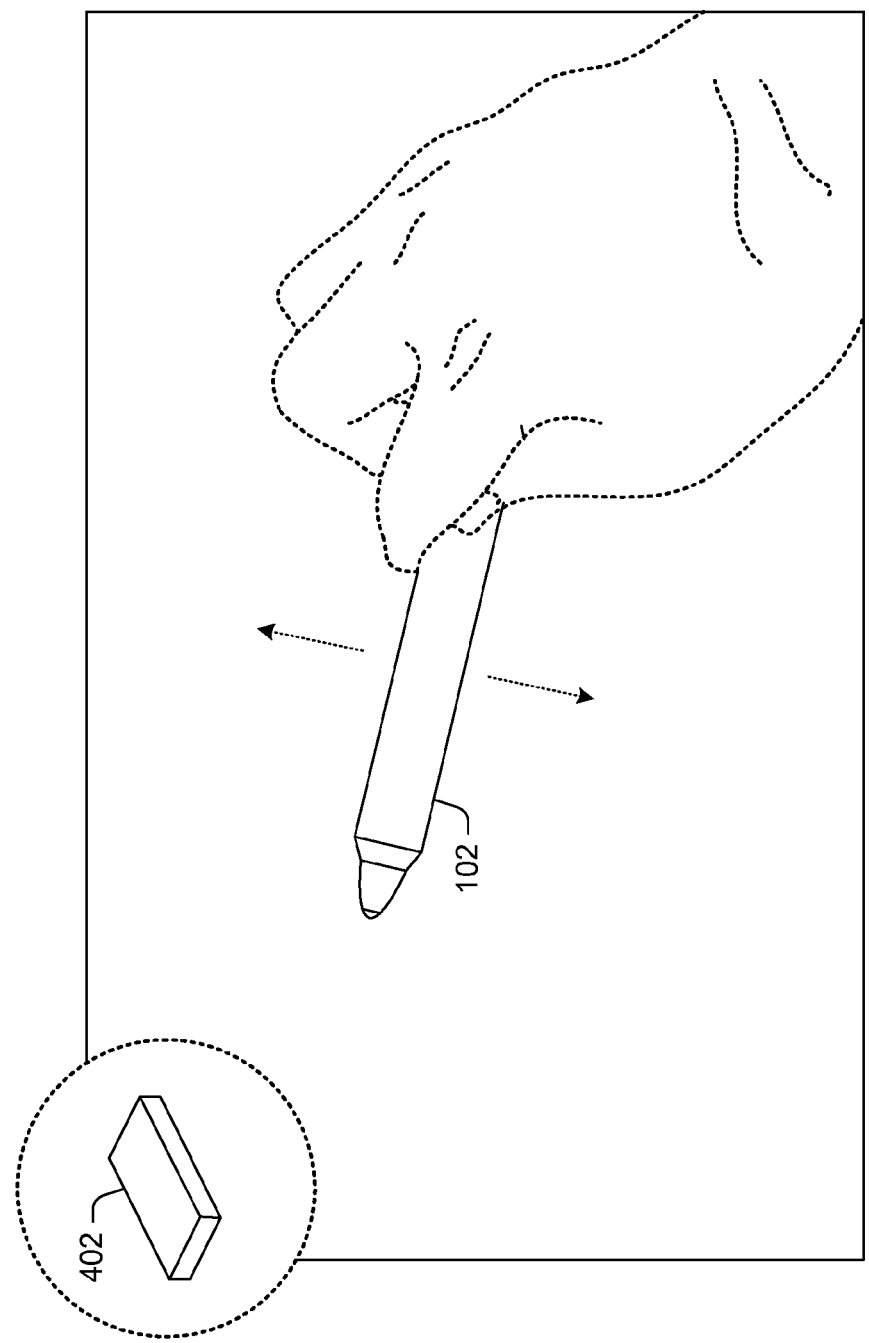
FIG. 4 is an illustrative diagram showing an example grip pattern that commands the multi-touch orientation sensing input device to function as a digital eraser tool.

FIG. 4 is an illustrative diagram showing an example grip pattern that commands the multi-touch orientation sensing input device 102 to function as an electronic eraser tool 402. In this scenario, the function module 224 may be part of a graphical illustration application that is running on the electronic device 130. The electronic device 130 may be a drawing tablet that uses the proximity sensor 206 to sense movement of the input device 102.

As such, the function module 224 may detect via a multi-touch input image that the user is holding the multi-touch orientation sensing input device 102 in a grip pattern corresponding to the grip shown in FIG. 4. The grip pattern may indicate that the user is holding the input device 102 at a tilt angle 122 that is within a predetermined angle range (e.g., 0°-5°), i.e., the input device 102 is parallel or substantially parallel to a horizontal surface. In such an instance, the function module 224 may determine that the input device 102 is to function as an electronic eraser tool 402 for the graphical illustration application. Accordingly, any lateral movement of the input device 102 detected by the proximity sensor 206 of the electronic device 130 may cause the graphical illustration application to digitally erase any previous drawn objects.

Figure 5:
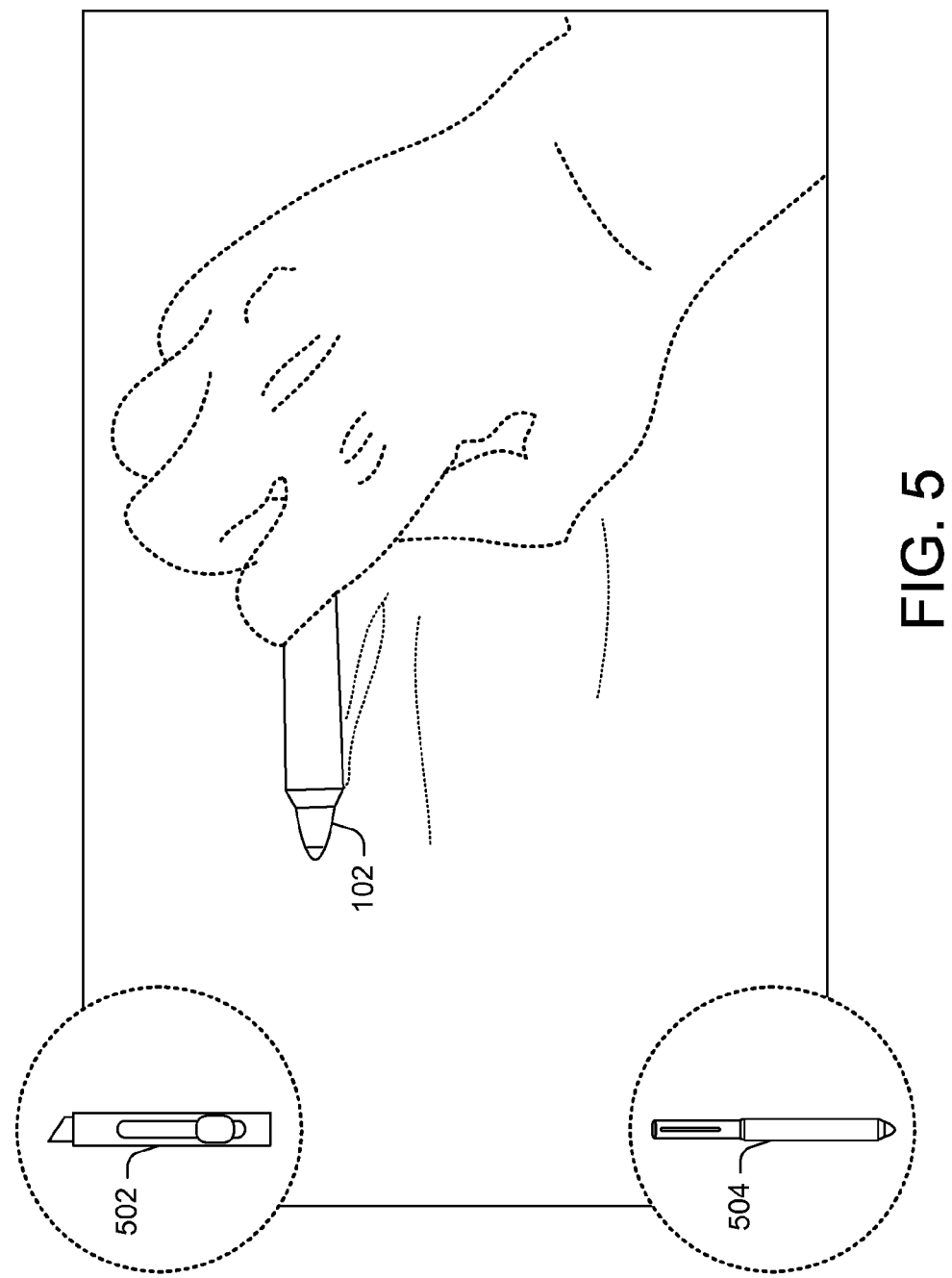
FIG. 5 is an illustrative diagram showing an example grip patterns that command the multi-touch orientation sensing input device to perform different functions.

FIG. 5 is an illustrative diagram showing an example grip patterns that command the multi-touch orientation sensing input device to perform different functions. In this scenario, the function module 224 may be part of a graphical illustration application that is running on the electronic device 130. The electronic device 130 may be a drawing tablet that uses the proximity sensor 206 to sense movement of the input device 102. Accordingly, if the user holds the multi-touch orientation sensing input device 102 in a grip pattern corresponding to the grip shown in FIG. 4 with a tilt angle 122 that is within a first predetermined range (e.g., 65°-90°), the function module 224 may determine that the input device 102 is to function as a digital cutting tool 502 (e.g., digital razor) that may be used to digitally slice apart an existing drawing. However, if the user holds the input device 102 in a grip pattern with the same grip but at a tilt angle 122 that is within a second predetermined range (e.g., 0°-64°), the function module 224 may determine that the input device 102 is to function as a digital sketching tool 504 (e.g., digital pen) for creating drawings.

Figure 6:
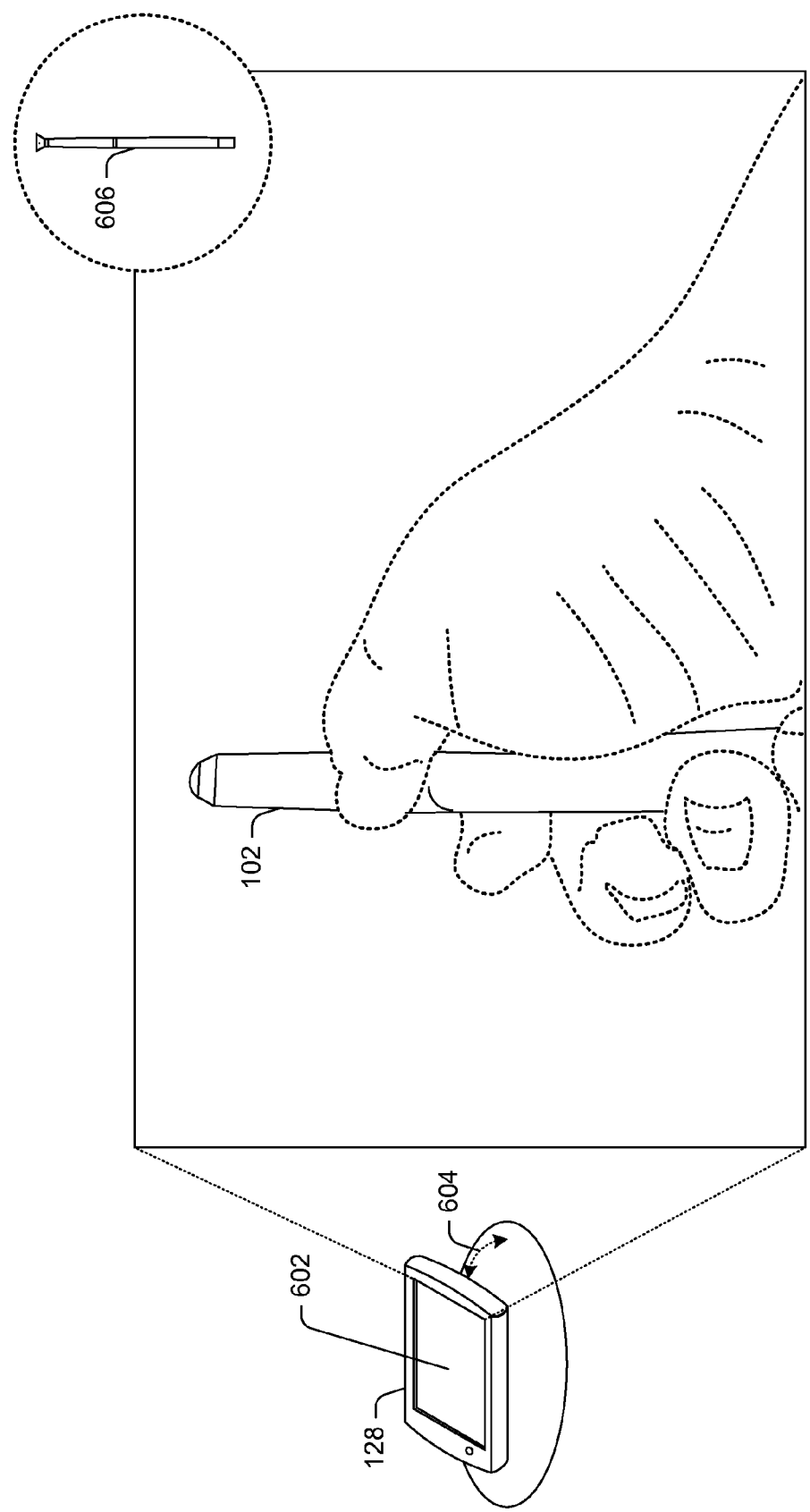
FIG. 6 is an illustrative diagram showing the determination of a function of a multi-touch orientation sensing input device based on an example grip pattern from multiple devices.

FIG. 6 is an illustrative diagram showing the determination of a function of a multi-touch orientation sensing input device based on an example grip pattern from multiple devices. In this scenario, the function module 224 may be part of a graphical illustration application that is running on the electronic device 130. The electronic device 130 may be a drawing tablet that uses the proximity sensor 206 to sense movement of the input device 102. As such, the function module 224 may detect via a multi-touch input image that the user is holding the multi-touch orientation sensing input device 102 in a grip pattern corresponding to the grip shown in FIG. 6. The grip pattern may indicate that the user is holding the input device 102 at a tilt angle 604 that is within a predetermined angle range (e.g., 0°-15°). Additionally, the function module 224 may also detect that the user is also holding the electronic device 130 at a tilt angle such that a digitizer surface 602 of the electronic device 130 is inclined above a horizontal surface. For example, the electronic device 130 may be at a tilt angle 604 that is within a predetermined angle range of 65°-90°, in which 0° represents parallel to a horizontal surface, and 90° represents perpendicular to a horizontal surface. When this occurs, the function module 224 may determine that the input device 102 is to function as a digital paintbrush 606 for creating drawings. In other instances, such an occurrence may also cause the function module 224 to switch between layers in a drawing that is being worked on using the graphical illustration application.

Figure 7:
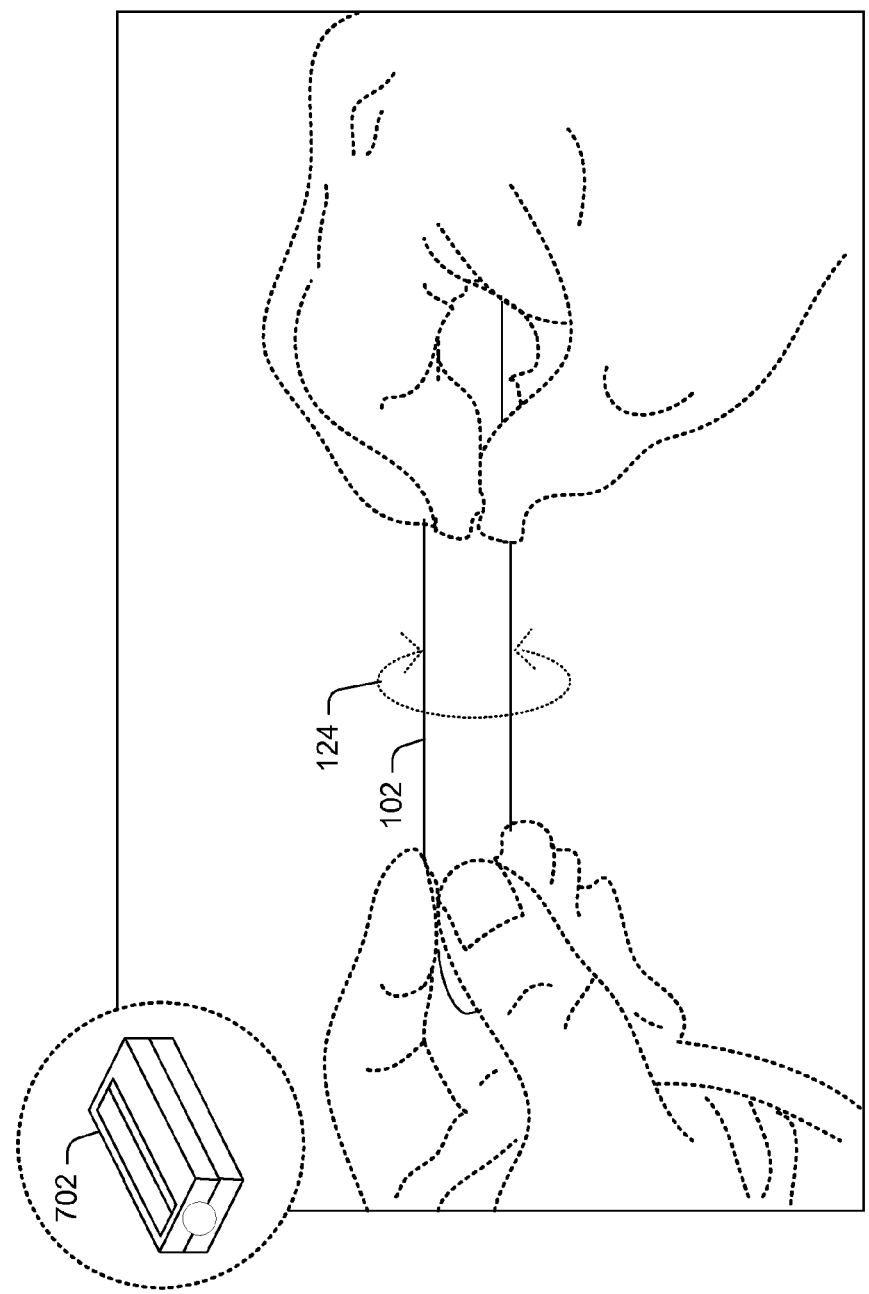
FIG. 7 is an illustrative diagram showing an example grip pattern that leads to change ink impression size when the multi-touch orientation sensing input device is functioning as a digital sketching tool.

FIG. 7 is an illustrative diagram showing an example grip pattern that leads to change ink impression size when the multi-touch orientation sensing input device is functioning as a digital sketching tool. In this scenario, the function module 224 may be part of a graphical illustration application that is running on the electronic device 130. The electronic device 130 may be a drawing tablet that includes a proximity sensor 206 that senses movement of the input device 102. As such, the function module 224 may detect via a multi-touch input image that the user is holding the multi-touch orientation sensing input device 102 in the handgrips shown in FIG. 7.

Further, the grip patterns corresponding to the handgrips may indicate that the user is holding the input device 10 at a tilt angle 122 that is within a predetermined angle range (e.g., 0°-15°). In such an instance, the function module 214 may determine that the user is attempting to change the ink size of an input device 102 that is functioning as a digital sketching tool. In other words, the user is attempting to use a virtual pencil sharpener 702 on the input device 102. Accordingly, when the user rotates the input device 102, i.e., increase or decrease the roll angle 124, the function module 224 may correspondingly increase or decrease the size of the ink impression made by the digital sketching tool. For example, an increase in the roll angle 124 may lead to a corresponding increase in the size of the ink impression, while a decrease in the roll angle 124 may lead to a corresponding decrease in the size of the ink impression.

Figure 8:
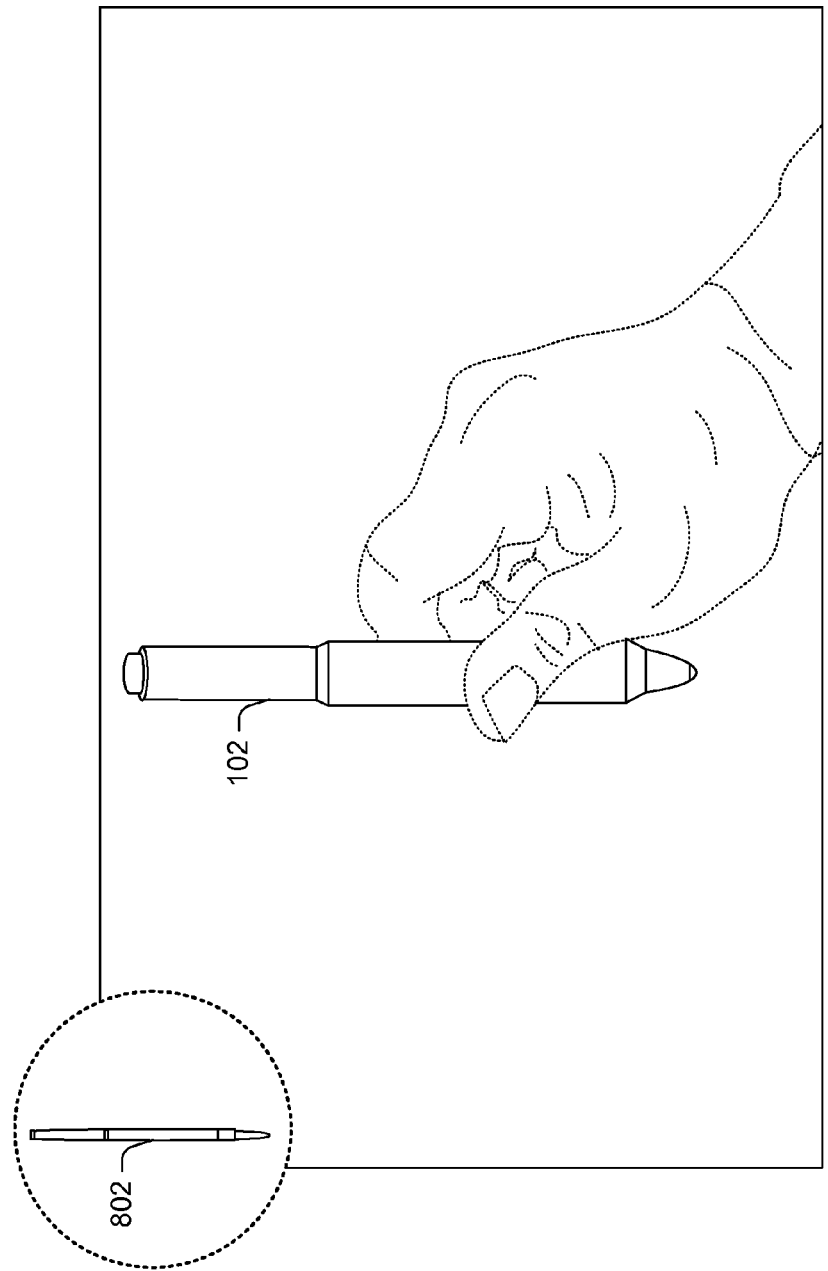
FIG. 8 is an illustrative diagram showing an example grip pattern that commands the multi-touch orientation sensing input device to function as a digital calligraphy brush tool.

FIG. 8 is an illustrative diagram showing an example grip pattern that commands the multi-touch orientation sensing input device to function as a digital calligraphy brush tool. In this scenario, the function module 224 may be part of a graphical illustration application that is running on the electronic device 130. The electronic device 130 may be a drawing tablet that includes a proximity sensor 206 that senses movement of the input device 102. As such, the function module 224 may detect via a multi-touch input image that the user is holding the multi-touch orientation sensing input device 102 in a grip pattern corresponding to the grip shown in FIG. 8. The grip pattern may indicate that the user is holding the input device 102 at a tilt angle 122 that is within a predetermined angle range (e.g., 75°-90°). In such an instance, the function module 224 may determine that the input device 102 is to function as a calligraphy brush 802 for writing.

Figure 9:
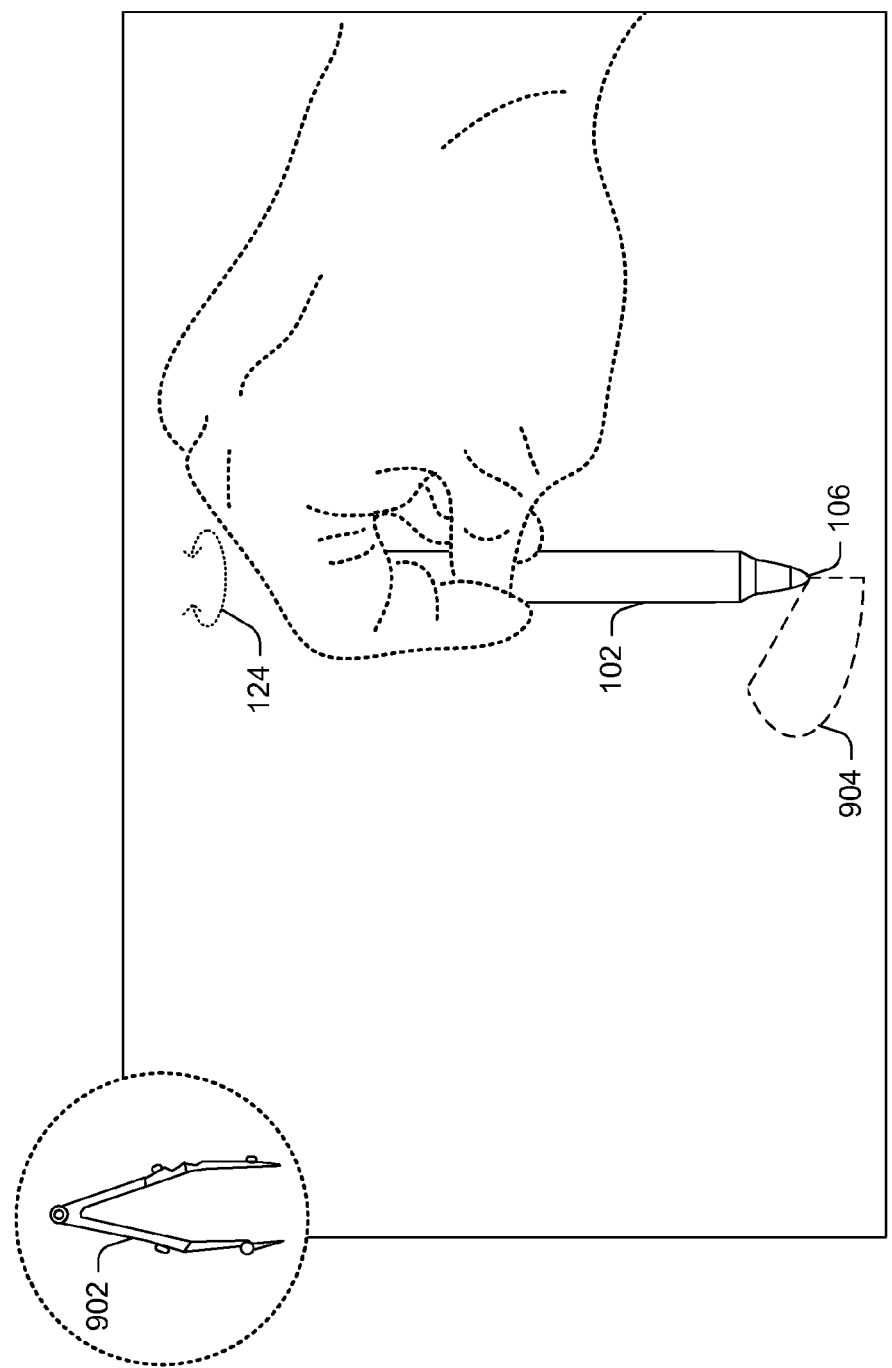
FIG. 9 is an illustrative diagram showing an example grip pattern that commands the multi-touch orientation sensing input device to function as a digital compass tool.

FIG. 9 is an illustrative diagram showing an example grip pattern that commands the multi-touch orientation sensing input device to function as a digital compass tool. In this scenario, the function module 224 may be part of a graphical illustration application that is running on the electronic device 130. The electronic device 130 may be a drawing tablet that includes a proximity sensor 206 that senses movement of the input device 102. As such, the function module 224 may detect via a multi-touch input image that the user is holding the multi-touch orientation sensing input device 102 in a grip pattern corresponding to the grip shown in FIG. 9. The grip pattern may indicate that the user is holding the input device 102 at a tilt angle 122 that is within a predetermined angle range (e.g., 75°-90°). In such an instance, the function module 224 may determine that the input device 102 is to function as a digital compass tool 902.

Accordingly, while the input device 102 is functioning as the digital compass 902, the user may press the input device 102 against a digitizer surface of the electronic device 130 to activate the pressure switch associated with the retractable tip 106. The pressure switch may include a pressure sensor. The activation of this pressure switch may cause an arc 904 to be digitally drawn. In some embodiments, the radius of the arc drawn may be directly proportional to the amount of the pressure sensed by the pressure switch. Further, the rotations of the input device 102, i.e., changes in the roll angle 124, may correspondingly increase or decrease the length of the arc 904.

Figure 10:
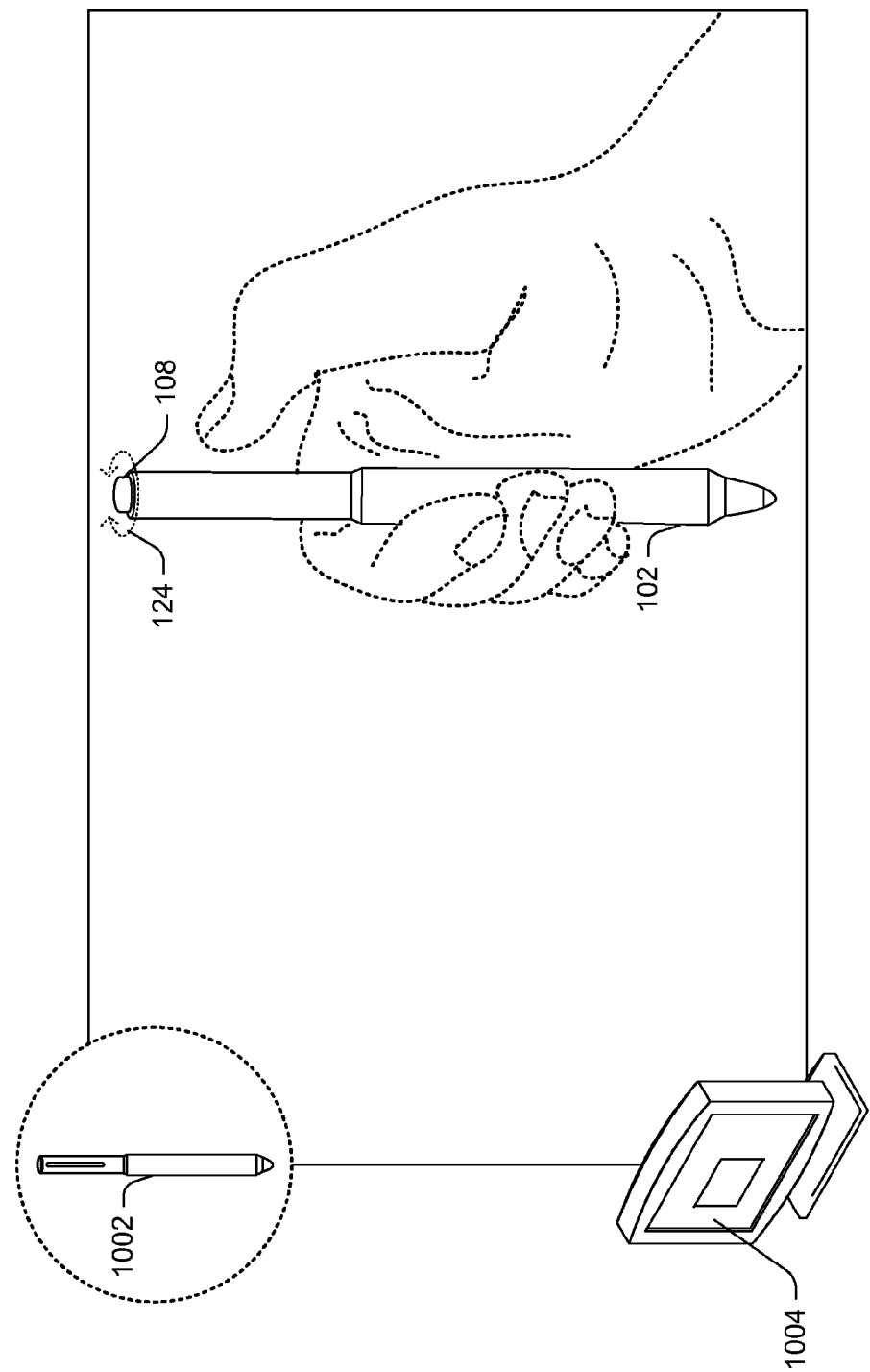
FIG. 10 is an illustrative diagram showing a manipulation of the multi-touch orientation sensing input device to change ink color when the multi-touch orientation sensing input device is functioning as a digital sketching tool.

FIG. 10 is an illustrative diagram showing a manipulation of the multi-touch orientation sensing input device to change ink color when the multi-touch orientation sensing input device is functioning as a digital sketching tool. In this scenario, the function module 224 may be part of a graphical illustration application that is running on the electronic device 130. The electronic device 130 may be a drawing tablet that includes a proximity sensor 206 that senses movement of the input device 102. As such, the function module 224 may determine from the multi-touch input image of the handgrip on the input device 102 and the tilt angle 124 of the input device 102 that the input device 102 is functioning as a digital sketch tool 1002.

Further, the function module 224 may also interpret additional inputs from the input device 102 to perform color selection for the digital sketch tool 1002. For example, the user may change the color of the digital sketch tool 1002 by rotating the input device 102, i.e., change the roll angle 124, to cause the graphical illustration application to cycle through each color in a spectrum of colors until a desired color is being previewed on a display 1004. Once the desired color is show on the display 1004, the user may press the clickable button 108 to select the color for use with the graphical illustration application.

Figure 11:
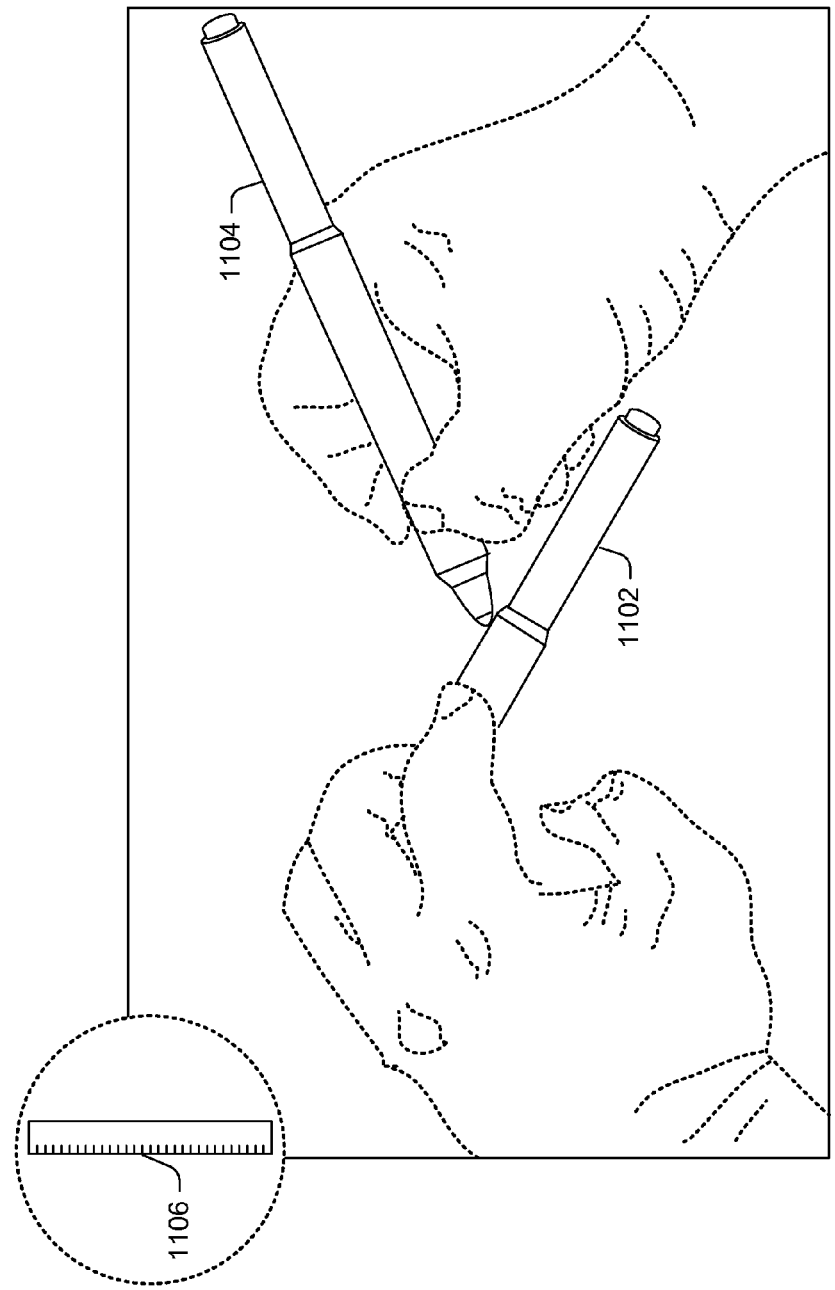
FIG. 11 is an illustrative diagram showing example grip patterns of multiple multi-touch orientation sensing input devices that are collectively performing a digital ruler function.

FIG. 11 is an illustrative diagram showing example grip patterns of multiple multi-touch orientation sensing input devices that are collectively performing a digital ruler function. In this scenario, the function module 224 may be part of a graphical illustration application that is running on the electronic device 130. The electronic device 130 may be a drawing tablet that includes a proximity sensor 206 that senses movement of the input device 102. As such, the function module 224 may detect via a multi-touch input image that the user is holding the multiple multi-touch orientation sensing input device 102 using grip patterns corresponding to the grips shown in FIG. 11. The grip pattern for one of the input devices 102, designated as device 1102, may indicate that the device 1102 is being held at a tilt angle 124 that is within a predetermined angle range (e.g., 0°-5°), i.e., the device 1102 is parallel or substantially parallel to a horizontal surface. Thus, the function module 224 may determine that the device 1102 and the device 1104 are in ruler mode 1106. Additionally, the function module 224 may also detect that a grip on the second of the input devices 102, designated as device 1104, indicates that the device 1104 is being used as a digital sketching tool. As such, the device 1104 may function as a digital sketch tool that draws straight lines regardless of whether the movement of the device 1104 is actually in a straight line.

Figure 12:
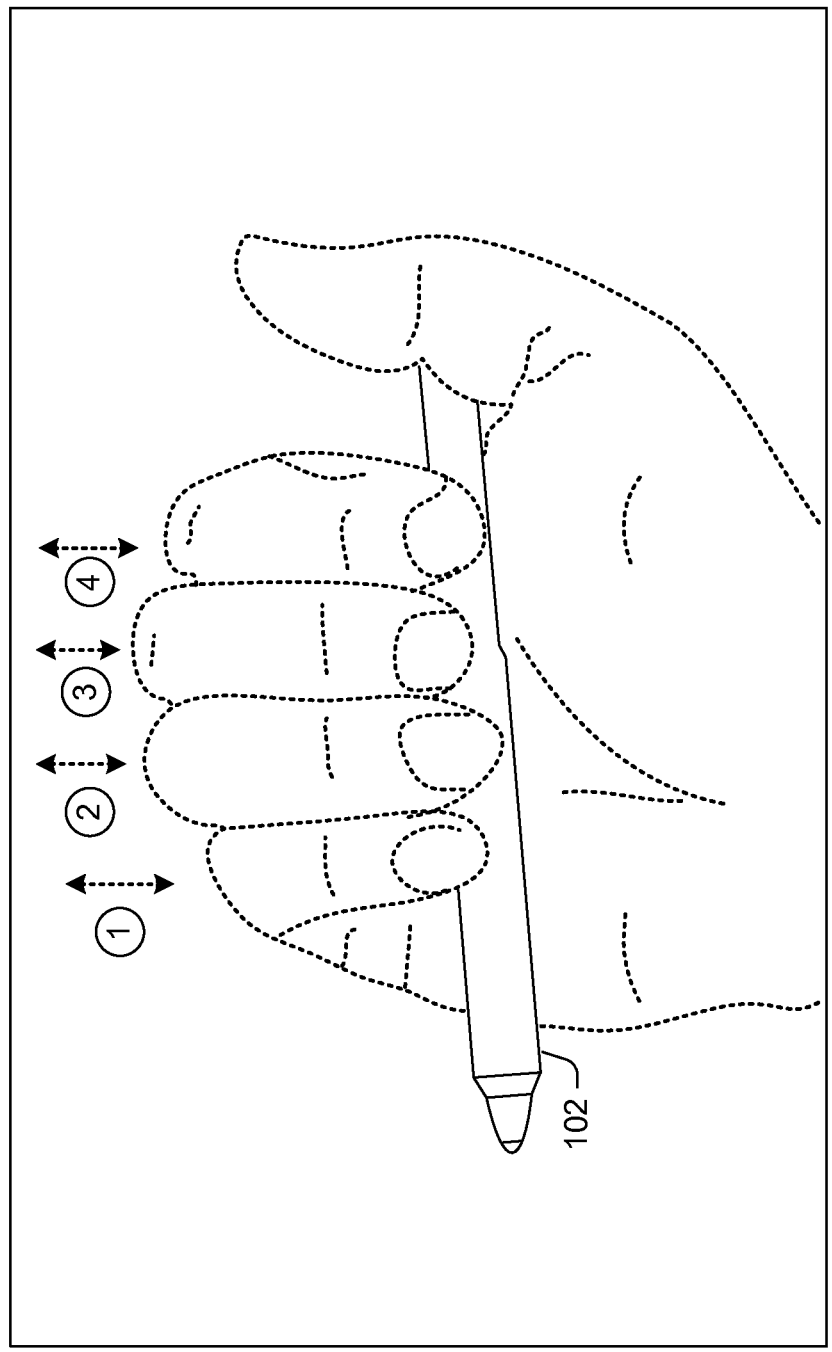
FIG. 12 is an illustrative diagram showing the use of a series of touches on the multi-touch orientation sensing tool to input commands to an electronic device.

FIG. 12 is an illustrative diagram showing the use of a series of touches on the multi-touch orientation sensing tool to input commands to an electronic device. In this scenario, the function module 224 may detect a series of different grip patterns via corresponding multi-touch input images in a predetermined time period. The series of multi-touch input images may correspond to multiple instances of different contacts performed on the multi-touch orientation sensing input device 102. For example, as shown, the user may move each of his fingers up away and then back down on the input device 102 in a particular sequence, as illustrated by the numerical sequence depicted in FIG. 12. Each finger movement may produce a different instance of hand contact with the input device 102 that is different in pattern from a previous instance of contact. The sequence of grip patterns resulting from these instances of contact may be interpreted by the function module 224 as correlating to a specific function command. For example, the specific function command may be for an application 232 that is a word processing application to perform a copy text function. In another example, the function module 224 may have determined from an initial grip pattern and/or tilt angle that the input device 102 is acting as an input device (e.g., a virtual flute) to a music generation application (e.g., an electronic flute application). Accordingly, the sequence of grip patterns may be interpreted by the function module 224 as correlating to a series of music notes to be recorded or played.

Figure 13:
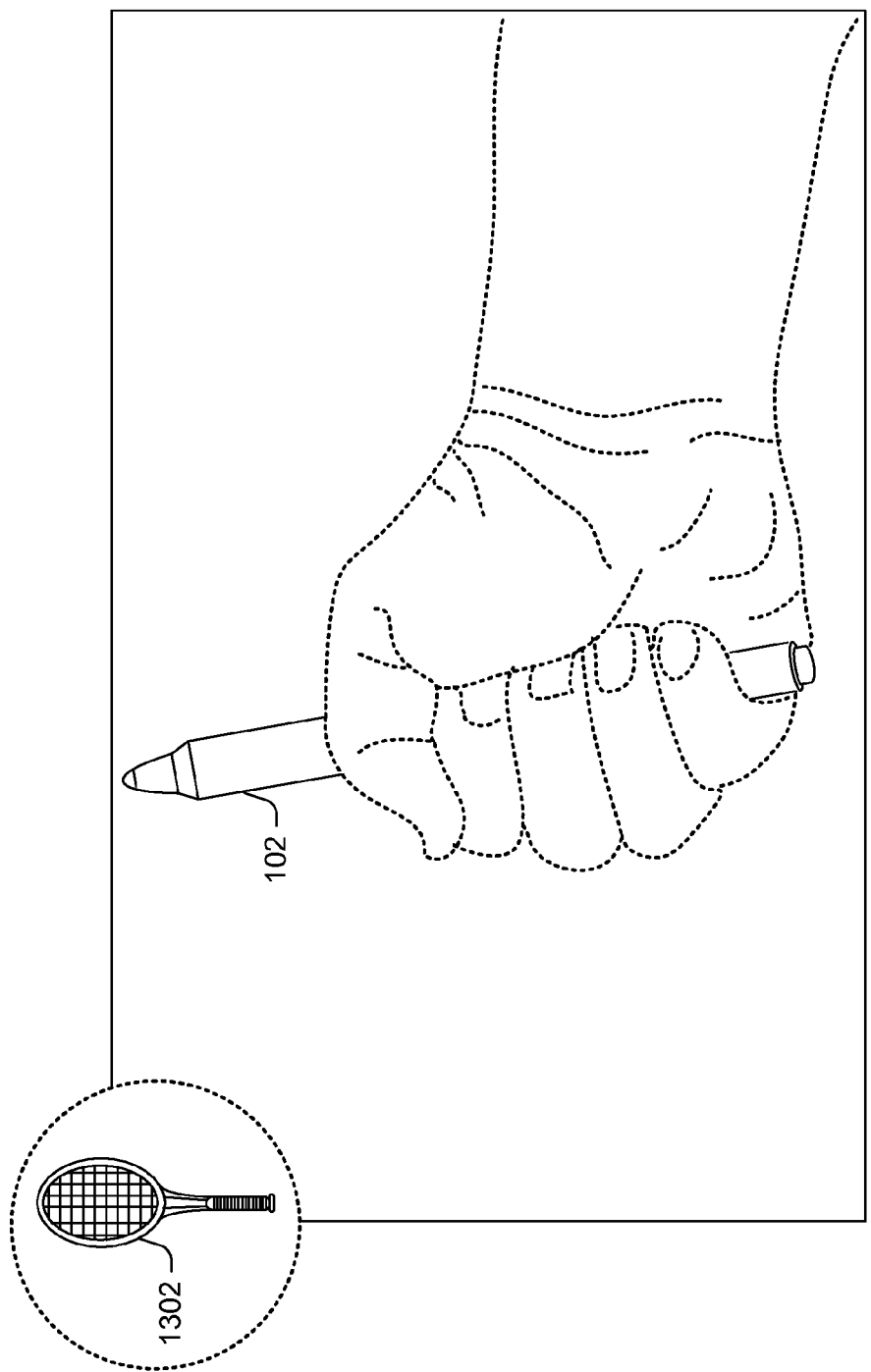
FIG. 13 is an illustrative diagram showing an example grip pattern that commands the multi-touch orientation sensing input device to function as a digital racquet in the context of a video game.

FIG. 13 is an illustrative diagram showing an example grip pattern that commands the multi-touch orientation sensing input device to function as a digital racquet in the context of a video game. In this scenario, the function module 224 may be part of a game application that is running on the electronic device 130. The electronic device 130 may be a game console that includes a proximity sensor 206 that senses movement of the input device 102. As such, the function module 224 may assign different controller functions according to detected grip patterns. For example, if a multi-touch input image detected by the function module 224 indicates that the user is holding to input device 102 in a grip pattern corresponding to the grip shown in FIG. 13, the function module 224 may configure the input device 102 to function as a tennis racquet 1322 for a tennis game application. In other example instances, the function module 224 may correlate other grip patterns, different single or double-handed grip patterns, with functions such as having the input device 102 acting as a gun controller for a shooting game application, acting as a fishing rod controller for a fishing game application, acting as a sword controller in a martial arts game application, a flute for a music game application, and so forth. In this way, the user may adapt the input device 102 to different games by simply switch the hand grip. In such instances, the detection of movements by the proximity sensor 206 may be translated by the corresponding application on the electronic device 130 as movements that facilitate game play. Further, additional controls on the input device 102, such as the clickable button 108, may provide additional game functions during game play.

Example Processes

Figure 14:
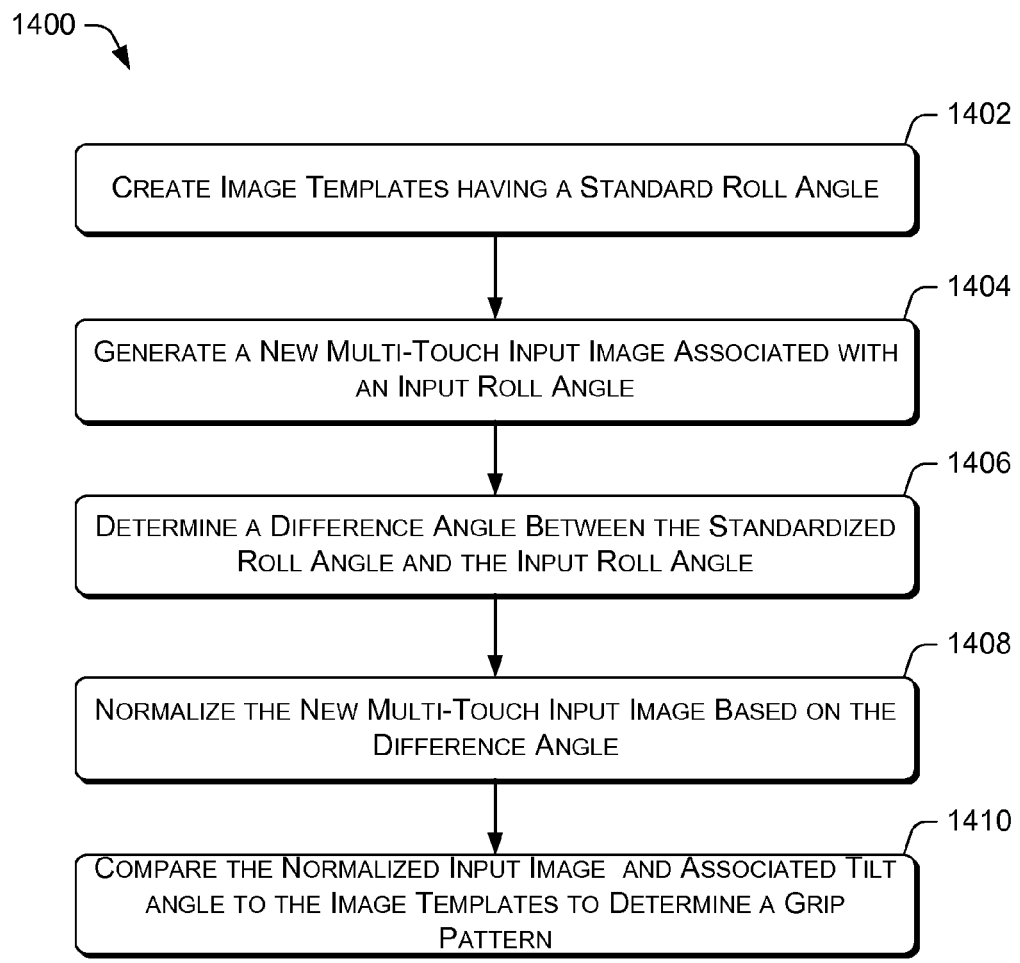
FIG. 14 is a flow diagram that illustrates an example process to determine a grip pattern that is used to grasp the multi-touch orientation sensing input device.
Figure 15:
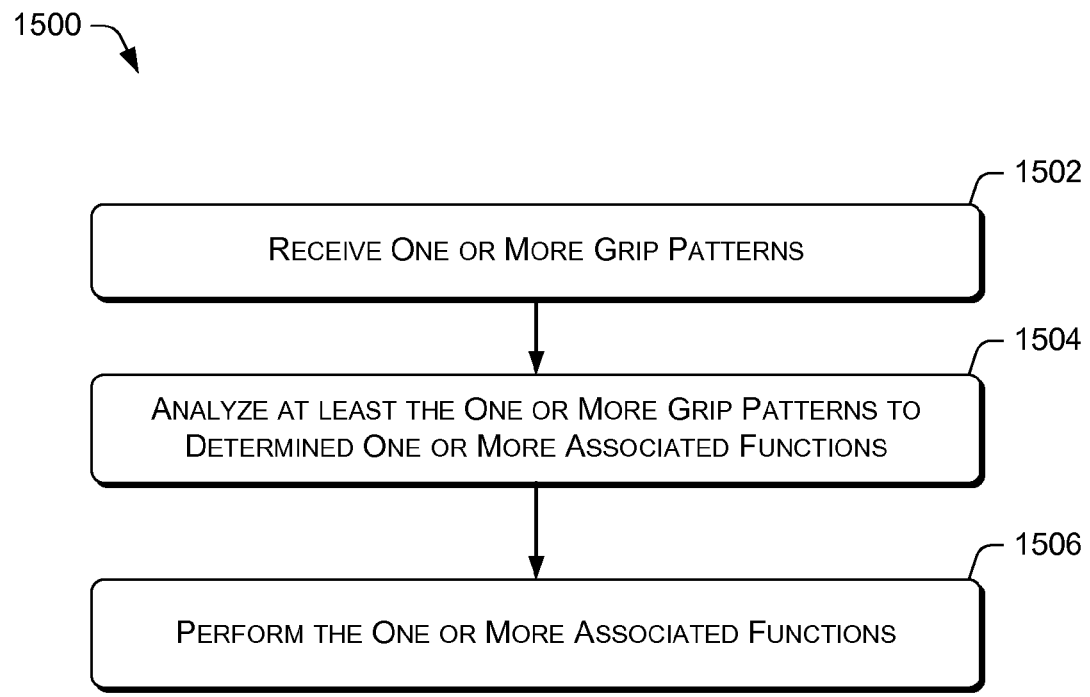
FIG. 15 is a flow diagram that illustrates an example process to perform a function that is inputted via the multi-touch orientation sensing input device.

FIGS. 14-15 describe various example processes that describe the operations of a multi-touch orientation sensing input device. The order in which the operations are described in each example process is not intended to be construed as a limitation, and any number of the described blocks can be combined in any order and/or in parallel to implement each process. Moreover, the blocks in each of the FIGS. 14-15 may be operations that can be implemented in hardware, software, and a combination thereof. In the context of software, the blocks represent computer-executable instructions that, when executed by one or more processors, cause one or more processors to perform the recited operations. Generally, computer-executable instructions include routines, programs, objects, components, data structures, and so forth that cause the particular functions to be performed or particular abstract data types to be implemented.

FIG. 14 is a flow diagram that illustrates an example process 1400 to determine a grip pattern that is used to grasp the multi-touch orientation sensing input device. At block 1402, a user may use the template generation module 226 to create multiple grip templates 234 from data inputs received from the multi-touch sensor 110 of multi-touch orientation sensing input device 102. The grip templates 234 may be multi-touch input images that are normalized to a standardized roll angle. Each of the grip templates 234 may include a particular grip pattern that is a combination a grip represented by a particular multi-touch image and the specific tilt angle of the input device at the time the particular multi-touch image is captured. The grip templates 234 may be stored in a pattern database 238.

At block 1404, the image generation module 218 may generate a new multi-touch input image. The new multi-touch input image may be generated from data inputs received from the multi-touch sensor 110 of the multi-touch orientation sensing input device 102. The multi-touch input image may include one or more image areas that represent where contact by a hand of the user with the multi-touch sensor 110 occurred, as well as image areas that represent the lack of contact with the multi-touch sensor 110.

At block 1406, the normalization module 220 may obtain a difference angle between the standardized roll angle of the grip templates 234 and the input roll angle. In some embodiments, the image generation module 218 may obtain the input roll angle by capturing a roll angle of the input device 102 as the image generation module 218 receives the multi-touch sensor data of the new multi-touch input image from the input device 102. Subsequently, the image generation module 218 passes the captured input roll angle to the normalization module 220.

At block 1408, the normalization module 220 may normalize the new multi-touch input image based on the difference angle between the standardized roll angle of the grip templates 234 and the input roll angle. In various embodiments, the normalization module 220 may use linear transformation and/or linear translation techniques to normalize the multi-touch input images according to the difference angle.

At block 1410, the comparison module 222 may compare the normalized multi-touch input image and its associated tilt angle, such as the tilt angle 122, to the grip templates 234 in the pattern database 238. The associated tilt angle may be the tilt angle of the input device 102 at the time that the normalized multi-touch input image is captured by the input device 102. The comparison may determine a grip pattern for the normalized multi-touch input image and its associated tilt angle. In various embodiments, the comparison module 222 may employ various classification schemes to find a template 234 that matches the normalized multi-touch input image and its associated tilt angle. Once a matching grip template is found, the comparison module 222 may designate the grip pattern of the matching grip template as the grip pattern for the normalized multi-touch input image with the associated tilt angle. Conversely, if no match between the normalized multi-touch input image and any of the grip templates 234 is found, the comparison module 222 may discard the new normalized multi-touch input image with the associated tilt angle. In some embodiments, the comparison module 222 may present a message to the user via the user interface module 228 that no grip pattern is detected.

FIG. 15 is a flow diagram that illustrates an example process to perform a function that is inputted via the multi-touch orientation sensing input device. At block 1502, the function module 224 may receive one or more grip patterns that are performed on the multi-touch orientation sensing input device 102. In some embodiments, the function module 224 may receive a single grip pattern at a time. In alternative embodiments, the function module 224 may obtain a series of grip patterns that were inputted within a predetermined time period. Each grip patterns may be derived using the example process 1400.

At block 1504, the function module 224 may analyze at least the one or more grip patterns to determine one or more associated functions that are to be performed by the electronic device 130. In some embodiments, the function module 224 may also analyze additional inputs from the input device 102 and the electronic device 130. Additional inputs from the multi-touch orientation sensing input device 102 that the function module 224 may also analyze includes detected roll angles 124, detected activations of the retractable tip 106, and/or detected activations of one or more clickable buttons, such as the clickable button 108. In further embodiments, the function module 224 may also analyze inputs provided by the electronic device 130. Such inputs from the electronic device 130 may include device roll angle and device tilt angle from the inertial measurement unit 204 and movement data from the proximity sensor 206. During the analysis, the function module 224 may determine one or more functions to be performed using a function database 240 that correlates specific combinations of one or more inputs from the input device 102 and the electronic device 130 to different functions.

At block 1506, an application on the electronic device 130 may perform the one or more associated functions. For example, in the context of a graphic illustration application, the application may perform an associated function to transform the input device 102 into a digital paintbrush tool. In another example in which the application is a game application, the application may perform an associated function to transform the input device 102 into a tennis racquet controller for use with the game application. In still another example, a series of inputted grip patterns may correspond to a copy function in a word processing application.

The multi-touch orientation sensing input device as described herein may enhance the task performance efficiency of the user by making it possible to perform different tasks with a single input device, instead of using multiple input devices. Further, since the use of the multi-touch orientation sensing input device does not force the user to hold the input device in unnatural ways, user comfort and perceived quality of the device may be enhanced. Further, when compared to other techniques for switching functions, such as using a menu selection in a user interface, the multi-touch orientation sensing input device described herein may provide the user with an experience that more closely approximates the experience of using different physical input devices.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. An input device, comprising:
a multi-touch sensor that at least partially encloses a body of the input device and that senses one or more contacts with the body;
an inertia measurement unit that is attached to the body and that at least measures a tilt angle of the body with respect to a horizontal surface and a roll angle of the body along a length-wise axis of the body with respect to an initial point on the body;
determining a difference angle between the roll angle of the body and a standardized roll angle of a plurality of grip templates, each grip template having a corresponding grip pattern that represents a corresponding grip on the input device and a corresponding tilt angle of the input device; and
comparing the tilt angle and the difference angle to each of the plurality of grip templates to determine a grip pattern that corresponds to a predefined function.

2. The input device of claim 1, further comprising a pressure switch that is activated by a retractable tip or a clickable button that is housed in the body.

3. The input device of claim 2, wherein the input device is a pen-shaped stylus that includes the retractable tip at a first end and the clickable button at a second end.

4. The input device of claim 1, further comprising a transceiver to transmit data related to the one or more contacts, the tilt angle, and the roll angle to another electronic device.

5. The input device of claim 1, wherein the inertia measurement unit includes at least one of an accelerometer, a compass, or a gyroscope.

6. The input device of claim 1, wherein the multi-touch sensor includes a plurality of capacitive sensing elements.

7. A computer-readable storage device storing computer-executable instructions that, when executed, cause one or more processors to perform acts comprising:
receiving multi-touch sensor data that indicates an instance of contact with a body of an input device, and an associated roll angle and an associated tilt angle of the body for the instance of contact;
generating a multi-touch input image based at least on the multi-touch sensor data;
determining a difference angle between the associated roll angle and a standardized roll angle of a plurality of grip templates, each grip template having a corresponding grip pattern that represents a corresponding grip on the input device and a corresponding tilt angle of the input device;
normalizing the multi-touch input image based at least on the difference angle to generate a normalized multi-touch input image; and
comparing the normalized multi-touch input image and the associated tilt angle to each of the plurality of grip templates to determine a grip pattern that corresponds to the normalized multi-touch input image.

8. The computer-readable storage device of claim 7, further comprising instructions that, when executed, cause the one or more processors to perform an act of indicating a lack of grip pattern detection when the normalized multi-touch input image and the associated tilt angle does not match corresponding grips and corresponding tilt angles included in the grip templates.

9. The computer-readable storage device of claim 7, further comprising instructions that, when executed, cause the one or more processors to perform an act of assigning a grip pattern of a particular grip template to the normalized multi-touch input image when the normalized multi-touch input image and the associated tilt angle matches a grip and a tilt angle included in the particular grip template.

10. The computer-readable storage device of claim 9, further comprising instructions that, when executed, cause the one or more processors to perform acts comprising:
determining a function based at least on the grip pattern assigned to the multi-touch input image; and
performing the function determined at least from the grip pattern.

11. The computer-readable storage device of claim 10, further comprising instructions that, when executed, cause the one or more processors to perform an act of receiving one or more additional inputs that includes at least one of a change in the roll angle of the input device, an activation of at least one pressure switch on the input device, a tilt angle of an electronic device that is connected to the input device, a rotation of the electronic device, movement sensed by a proximity sensor of the electronic device, an additional grip pattern from an additional input device that is connected to the electronic device, a tilt angle of the additional input device, or a change in the roll angle of the additional input device.

12. The computer-readable storage device of claim 11, wherein the determining includes determining the function based on the grip pattern assigned to the multi-touch image and the one or more additional inputs.

13. The computer-readable storage device of claim 10, wherein the function is to change a functionality of the input device with respect to a graphics illustration application, a game application, or a word processing application.

14. The computer-readable storage device of claim 7, further comprising instructions that, when executed, cause the one or more processors to perform an act of creating a grip template by correlating an additional multi-touch input image and an additional tilt angle with a grip pattern.

15. A computer-implemented method, comprising:
receiving multi-touch sensor data that indicates one or more contact instances with a body of an input device;
generating multi-touch input image for each of the one or more contact instances based at least on the multi-touch sensor data, each multi-touch input image being correlated with a respective tilt angle and a roll angle of the body of the input device;
determining a corresponding difference angle between the roll angle for a multi-touch input image of the contact instance and a standardized roll angle of a plurality of grip templates;
determining a corresponding grip pattern that represents a corresponding way that a user holds the input device at a corresponding tilt angle and with a corresponding difference angle for each multi-touch input image; and
identifying a function to be performed using the input device based on at least one grip pattern.

16. The computer-implemented method of claim 15, wherein determining the corresponding grip pattern further includes:
normalizing the multi-touch input image based at least on the corresponding difference angle;
matching the multi-touch input image and a particular tilt angle of the input device correlated with the multi-touch input image to a grip template of a plurality of grip templates, each of the grip templates including data on an associated grip on the input device and an associated tilt angle of the input device; and assigning an associated grip pattern of a matching grip template from the plurality of templates to the multi-touch input image and the particular tilt angle.

17. The computer-implemented method of claim 15, further comprising performing the function that is identified based on the at least one grip pattern.

18. The computer-implemented method of claim 15, wherein the identifying includes identifying the function based on a specific sequence of grip patterns.

19. The computer-implemented method of claim 15, wherein the function is to change a functionality of the input device with respect to a graphics illustration application, a game application, or a word processing application.

20. The computer-implemented method of claim 15, further comprising receiving one or more additional inputs that includes at least one of a change in the roll angle of the input device, an activation of at least one pressure switch on the input device, a tilt angle of an electronic device that is connected to the input device, a rotation of the electronic device, movement sensed by a proximity sensor of the electronic device, an additional grip pattern from an additional input device that is connected to the electronic device, a tilt angle of the additional input device, or a change in the roll angle of the additional input device, and wherein the identifying includes identifying a function based on at least one grip pattern and the one or more additional inputs.

\* \* \* \* \*